United States Patent
Iwai et al.

(10) Patent No.: US 8,340,403 B2
(45) Date of Patent: Dec. 25, 2012

(54) LEARNING DEVICE, LEARNING METHOD, IDENTIFYING DEVICE, IDENTIFYING METHOD, AND PROGRAM

(75) Inventors: Yoshiaki Iwai, Tokyo (JP); Shunichi Homma, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 12/938,620

(22) Filed: Nov. 3, 2010

(65) Prior Publication Data

US 2011/0182515 A1 Jul. 28, 2011

(30) Foreign Application Priority Data

Jan. 27, 2010 (JP) ................. 2010-015087

(51) Int. Cl.
*G06K 9/00* (2006.01)
*G06F 15/18* (2006.01)
(52) U.S. Cl. .......................... 382/154; 706/12
(58) Field of Classification Search .............. 382/154, 382/155, 157, 159, 190, 198; 700/47; 701/59; 702/190; 706/12, 16, 25
See application file for complete search history.

(56) References Cited

U.S. PATENT DOCUMENTS

| | | | | |
|---|---|---|---|---|
| 5,832,183 A | * | 11/1998 | Shinohara et al. | ............. 706/20 |
| 2007/0098255 A1 | * | 5/2007 | Yokono | ......................... 382/159 |

FOREIGN PATENT DOCUMENTS

JP 2007-128195 5/2007

OTHER PUBLICATIONS

Paul Viola, et al., "Robust Real-Time Face Detection," International Journal of Computer Vision 57(2), 2004, pp. 137-154.
Gabriella Csurka, et al., "Visual Categorization with Bags of Keypoints," ECCV2004, 16 pages.
Svetlana Lazebnik, et al., "Beyond Bags of Features: Spatial Pyramid Matching for Recognizing Natural Scene Categories," Proceedings of the 2006 IEEE Computer Society Conference on Computer Vision and Pattern Recognition (CVPR'06), 8 pages.
U.S. Appl. No. 12/963,031, filed Dec. 8, 2010, Iwai, et al.

\* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

A learning device includes: a feature point extracting unit for extracting a feature point from each of multiple generated images; a feature point feature amount extracting unit for extracting feature point feature amount representing the feature of the feature point from the generated image; a whole feature amount calculating unit for calculating the whole feature amount representing the feature of the whole generated image from the feature point feature amount of the generated image based on a shared code book including generated feature amount to be commonly used for generation of an identifier for identifying each of different identified objects; and an identifier generating unit for generating the identifier based on the whole feature amount of the generated image, and a correct answer label representing whether the generated image is the positive image or the negative image.

22 Claims, 21 Drawing Sheets

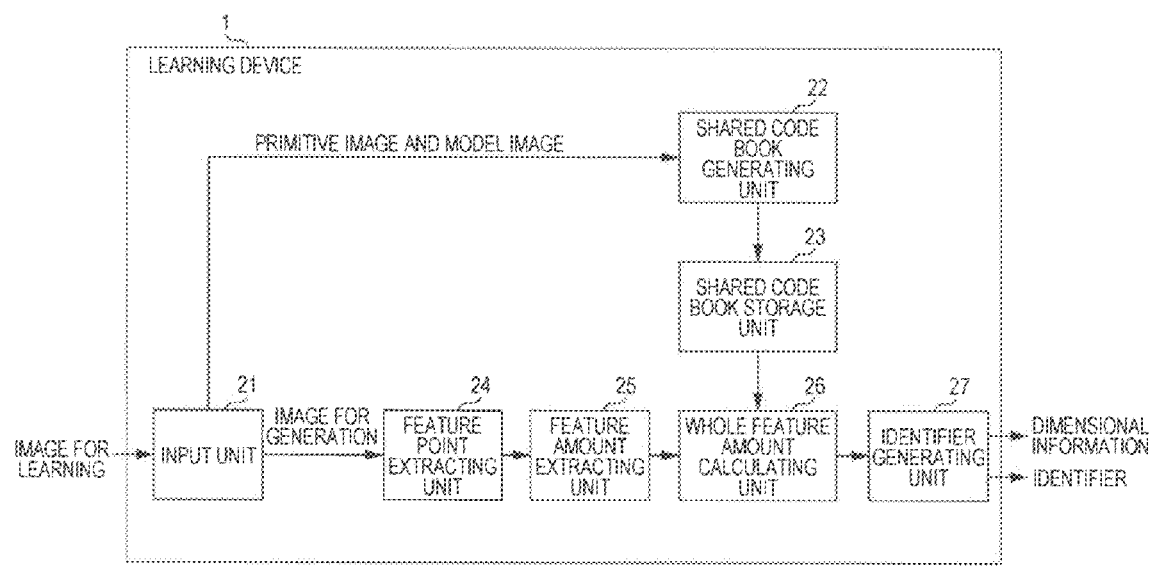

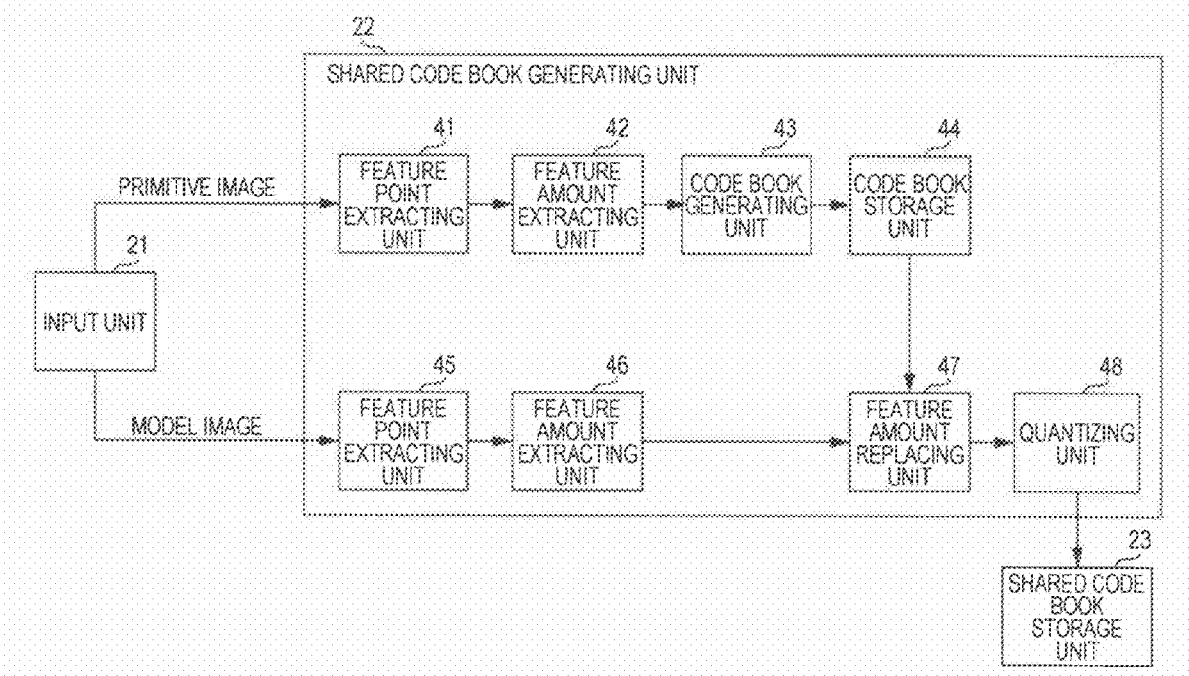

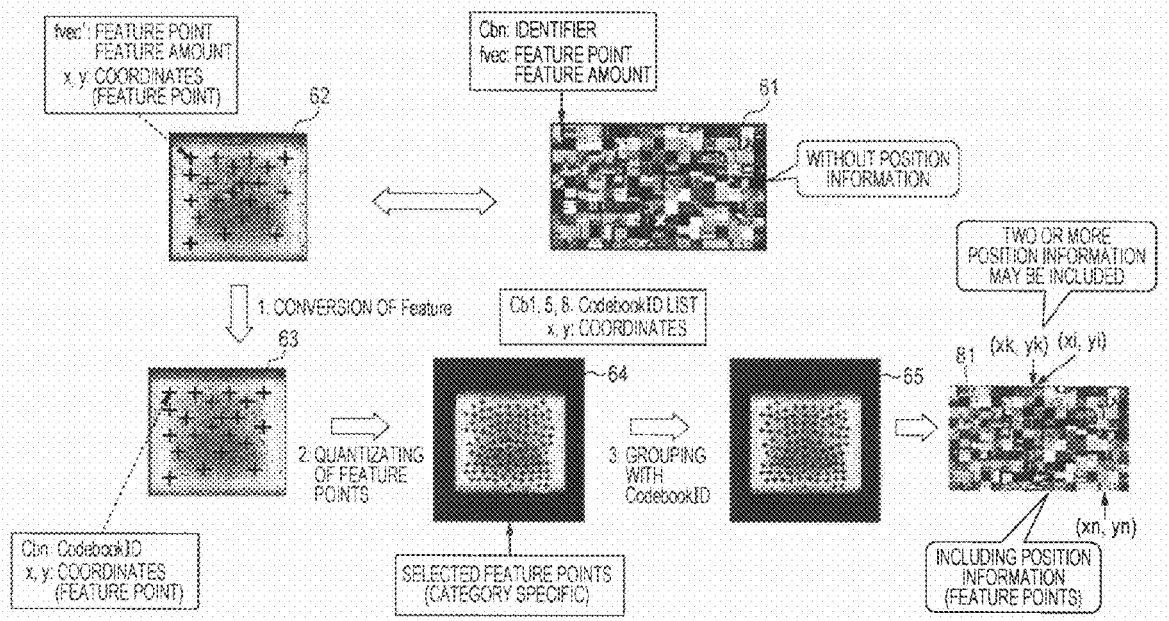

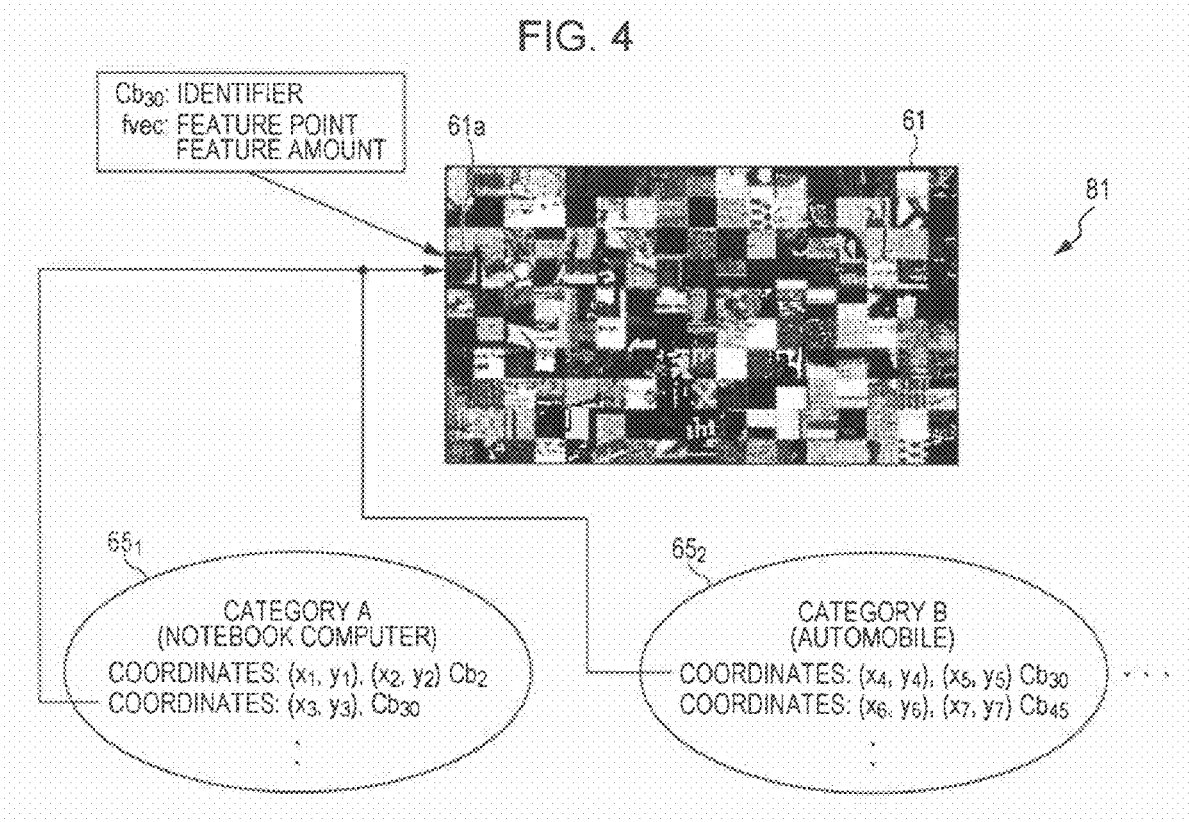

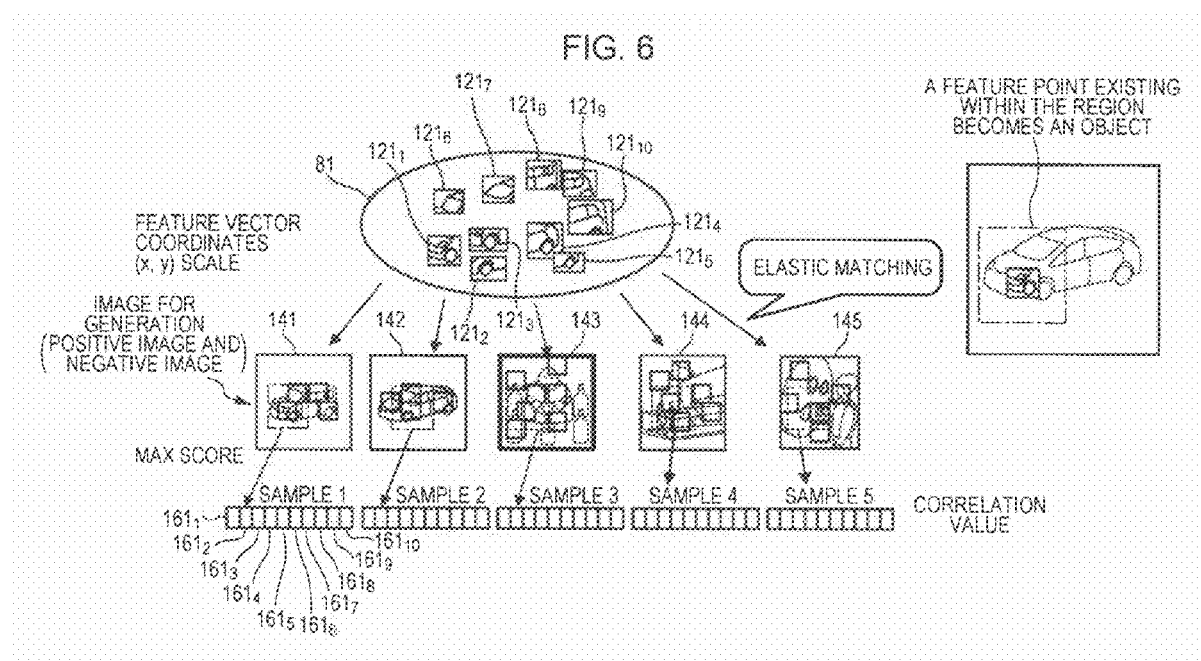

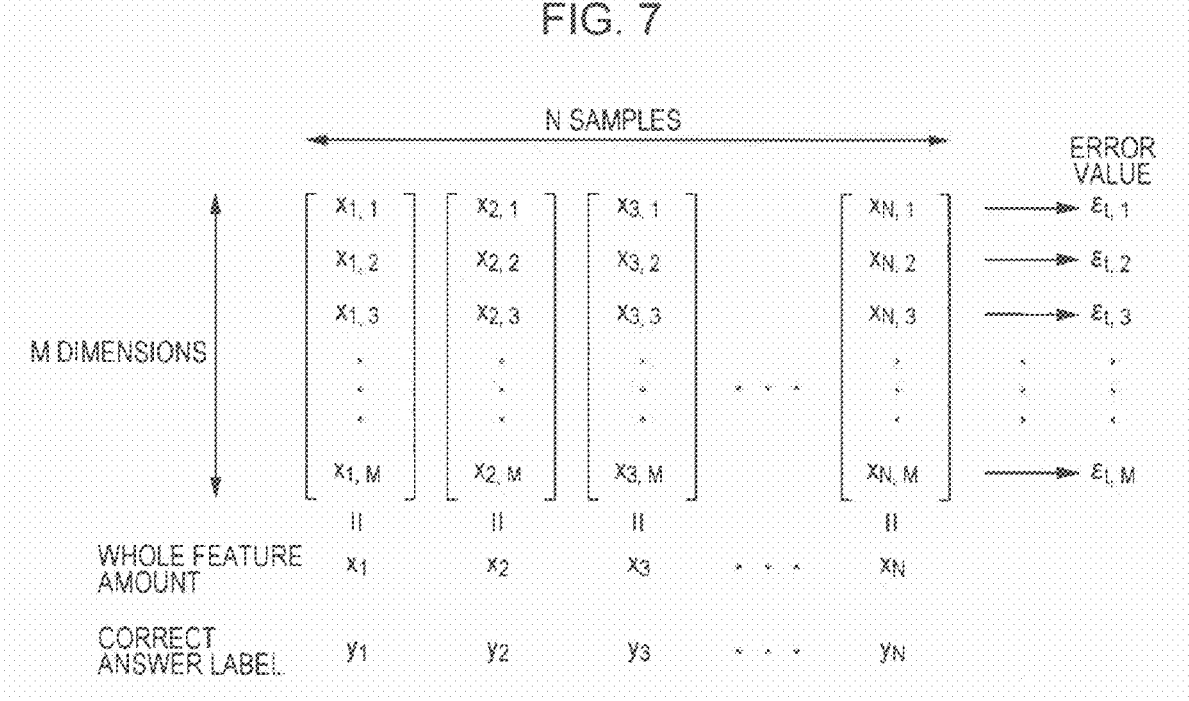

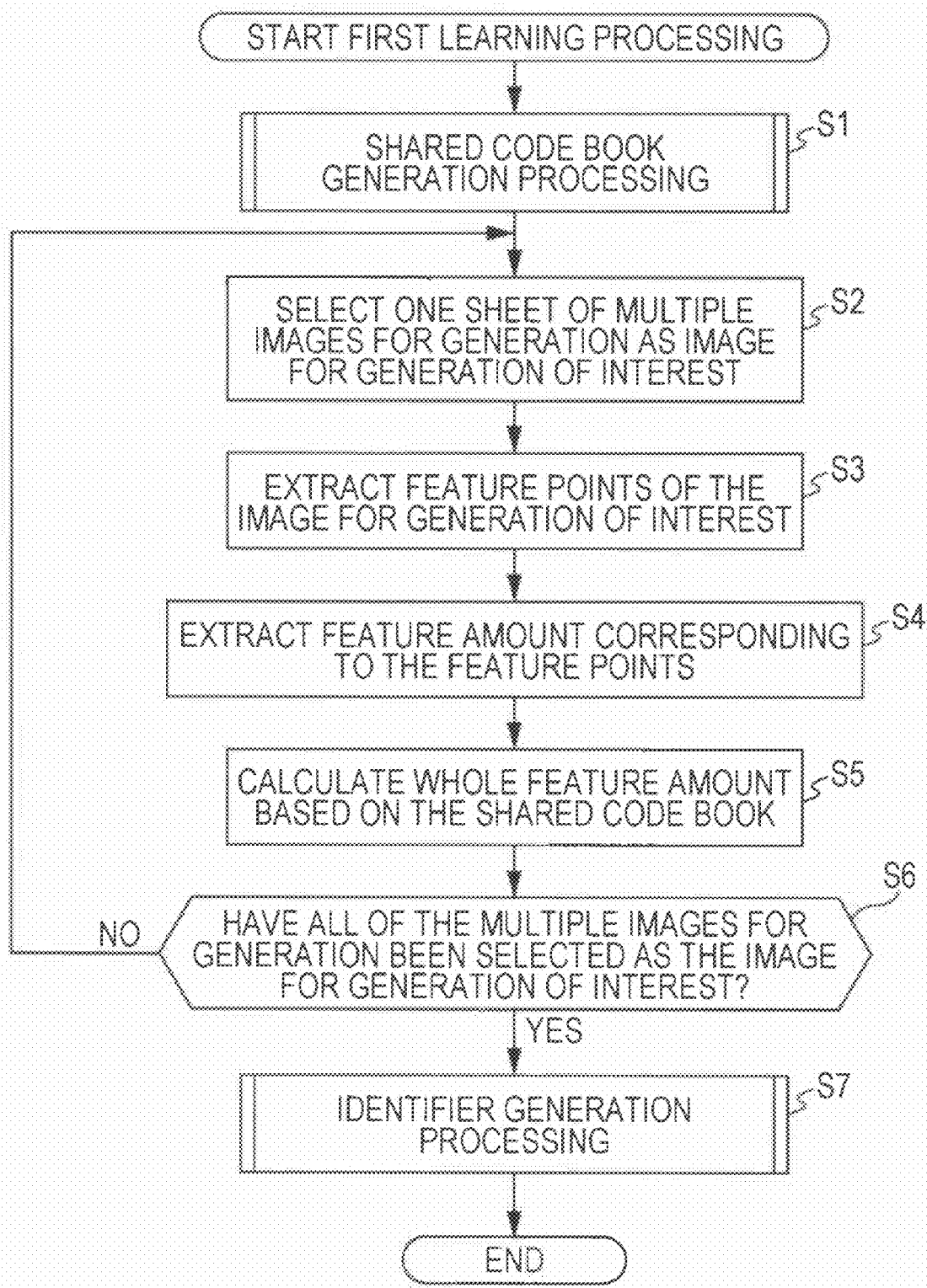

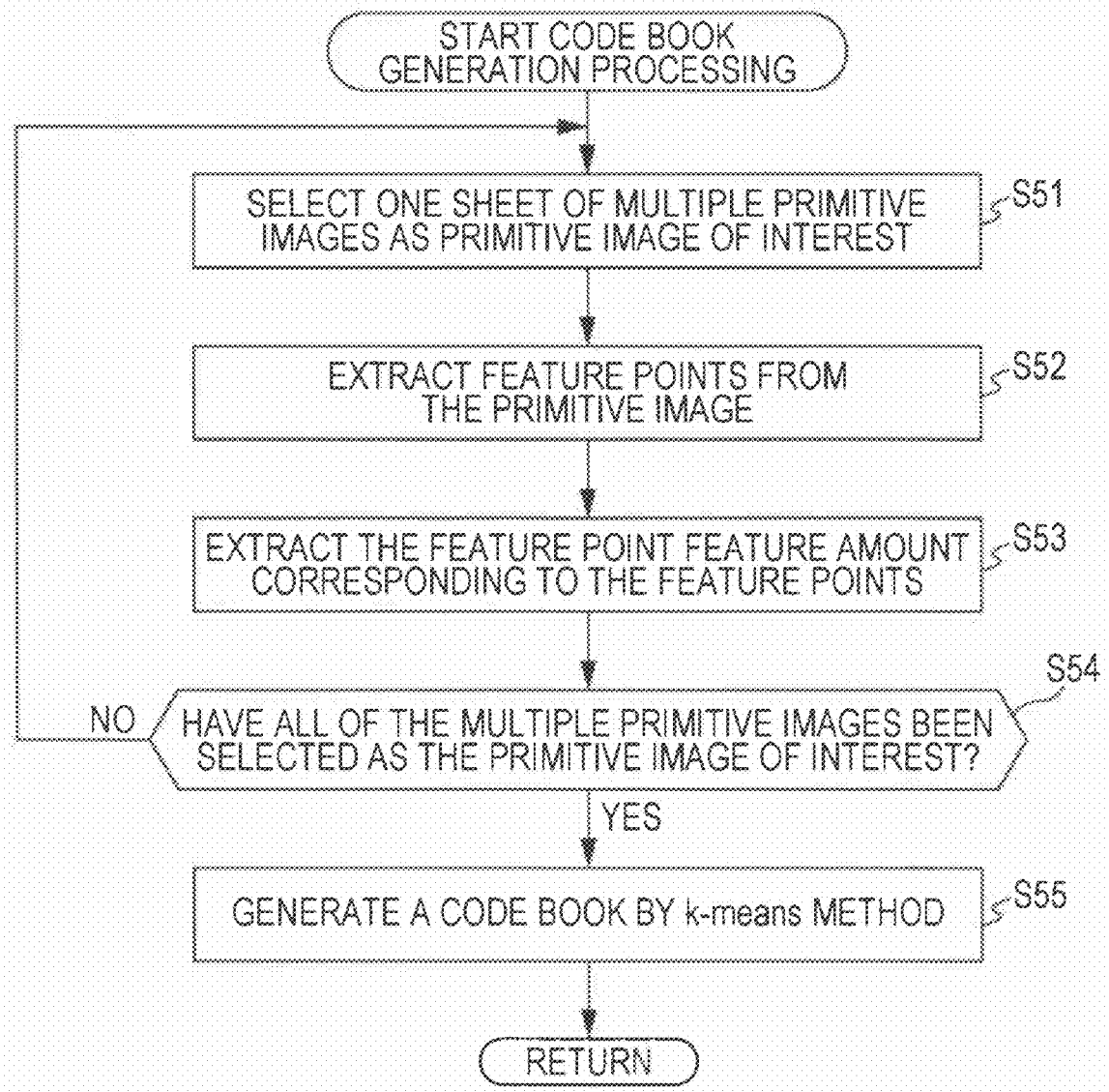

FIG. 11

```
        START IDENTIFIER GENERATION PROCESSING
                        │
                        ▼
```

S71: SET INITIAL VALUES $D_1(1)$ THROUGH $D_1(N)$ OF WEIGHT $D_t(i)$ WHICH AN IDENTIFICATION RESULT ERROR OF i'TH IMAGE FOR GENERATION AFFECTS, TO ERROR VALUES $\varepsilon_{t,d}$ REPRESENTING A DEGREE THAT Weak Learner $h_{t,d}(x_{i,d})$ MAKES AN ERROR OF IDENTIFICATION

S72: INITIALIZE VARIABLE t FOR COUNTING THE NUMBER OF Weak Learners $h_{t,d}(x_{i,d})$ MAKING UP IDENTIFIER $H(x)$ TO 1

S73: DETERMINE (THRESHOLD $TH_{t,d}$ OF) Weak Learners $h_{t,d}(x_{i,d})$ REGARDING EACH OF DIMENSION $d = 1, 2, ..., M$ SO THAT THE ERROR VALUE $\varepsilon_{t,d}$ TO BE OBTAINED BY USING THE WEIGHT $D_t(i)$ BECOMES THE MINIMUM

S74: OBTAIN THE MINIMUM VALUE (MINIMUM ERROR VALUE) $\varepsilon_t$ OF THE ERROR VALUES $\varepsilon_{t,1}, \varepsilon_{t,2}, ..., \varepsilon_{t,M}$, AND DIMENSION (MINIMUM ERROR DIMENSION) $d(t)$ SERVING AS THE MINIMUM ERROR VALUE $\varepsilon_t$ THEREOF

S75: OBTAIN RELIABILITY $\alpha_t$ OF t'TH Weak Learner $h_{t,d(t)}(x_{i,d})$ MAKING UP THE IDENTIFIER $H(x)$

S76: UPDATE THE WEIGHT $D_t(i)$ TO WEIGHT $D_{t+1}(i)$ USING THE RELIABILITY $\alpha_t$

S77: $t = T$? — NO → S78: $t++$ (loop back)
YES ↓

S79: OUTPUT T Weak Learners $h_{1,d(1)}(x_{i,d(1)}), h_{2,d(2)}(x_{i,d(2)}), ..., h_{T,d(T)}(x_{i,d(T)})$, AND THE RELIABILITY $\alpha_1, \alpha_2, ..., \alpha_T$ AS THE IDENTIFIER $H(x)$, AND ALSO OUTPUT T MINIMUM ERROR DIMENSIONS $d(1), d(2), ..., d(T)$ AS DIMENSIONAL INFORMATION

```
                        ▼
                     RETURN
```

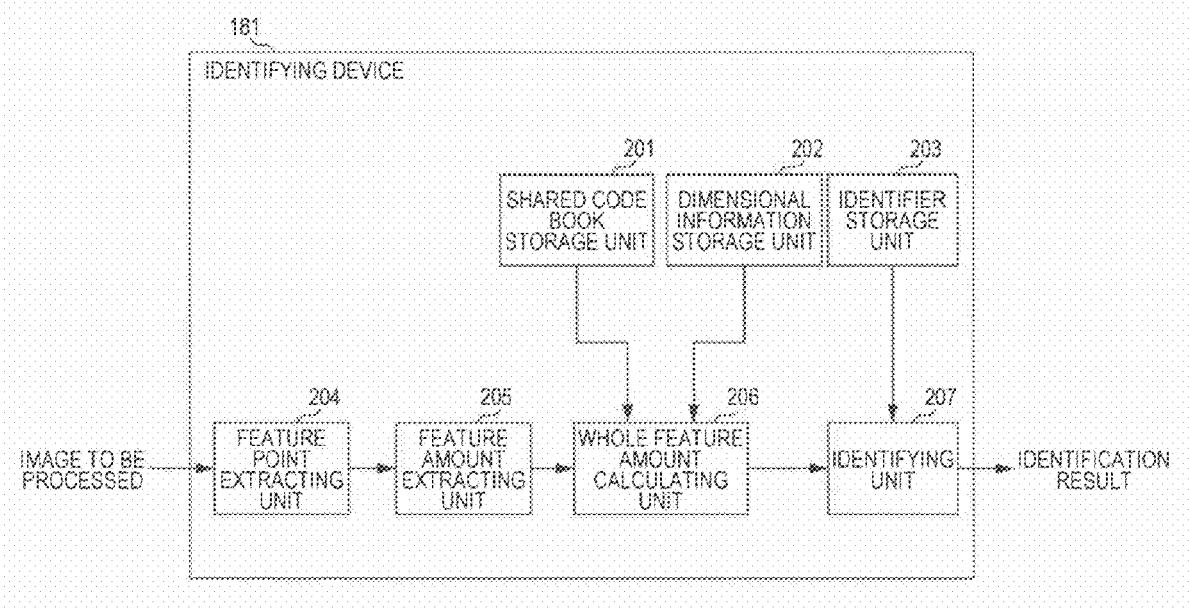

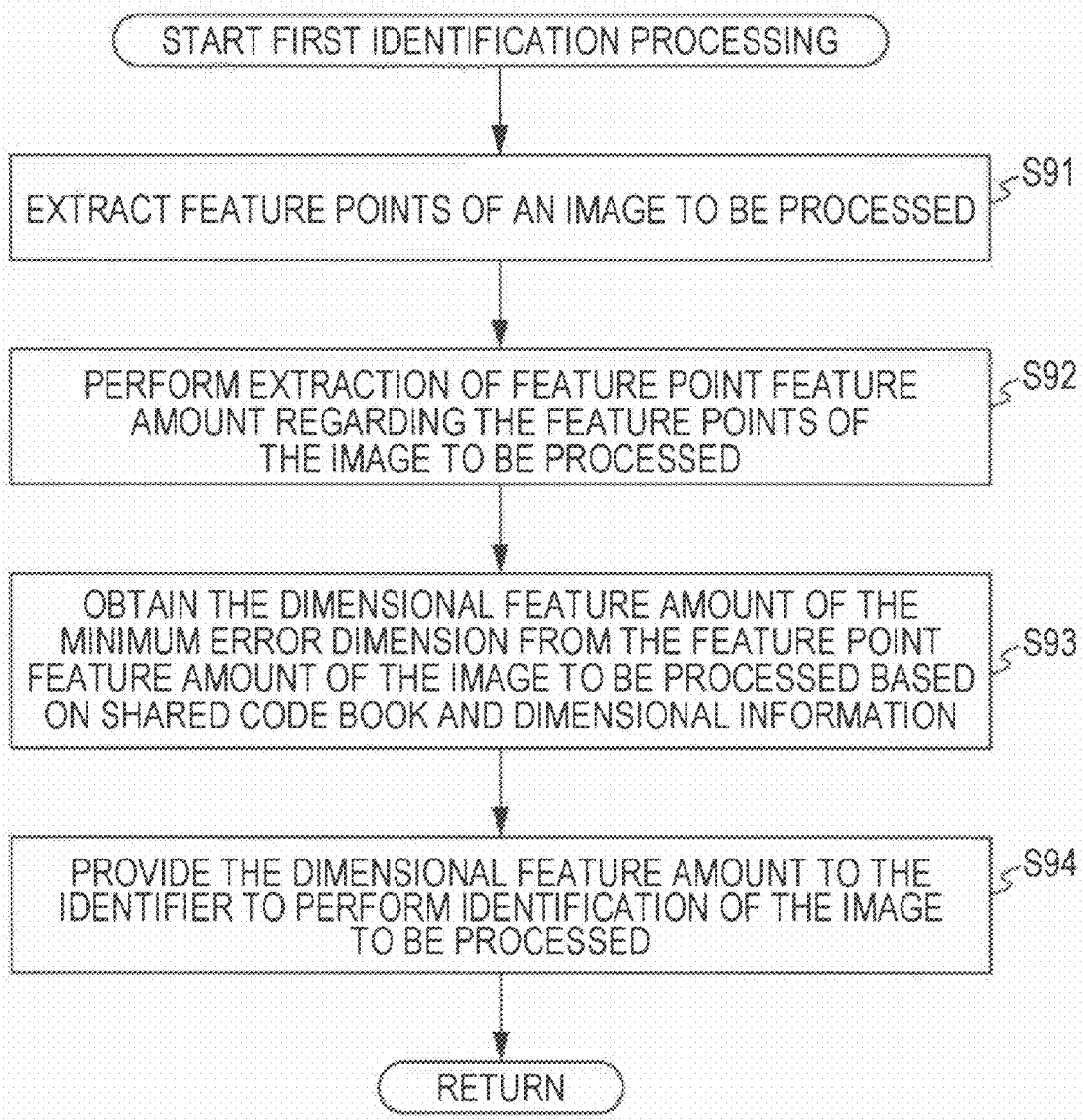

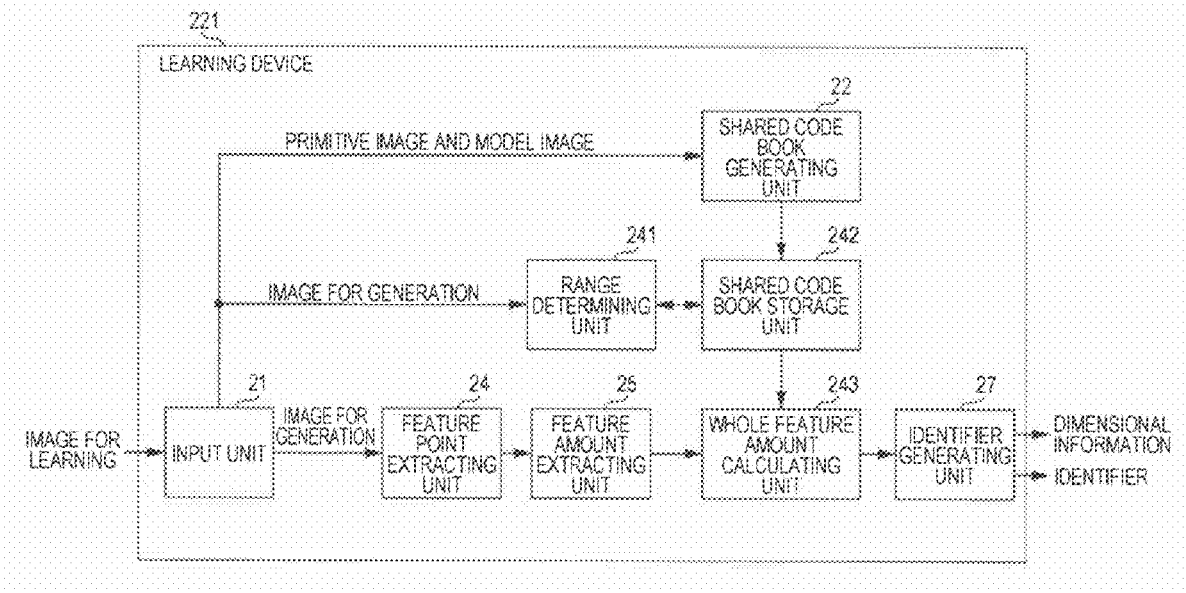

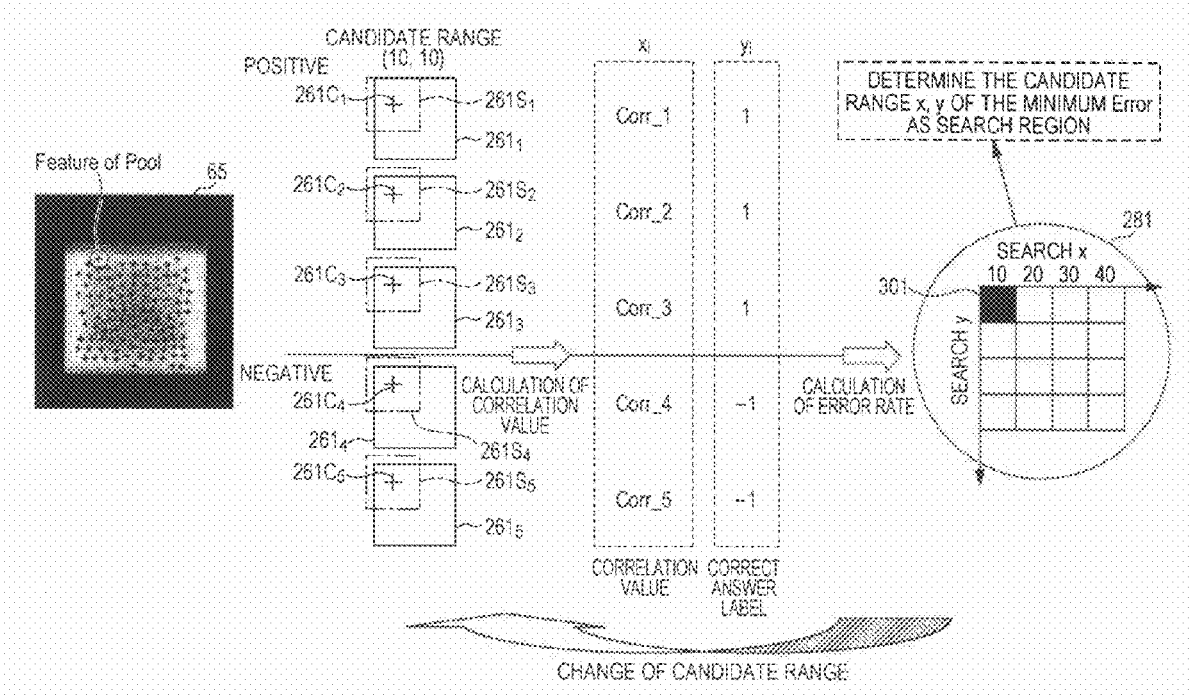

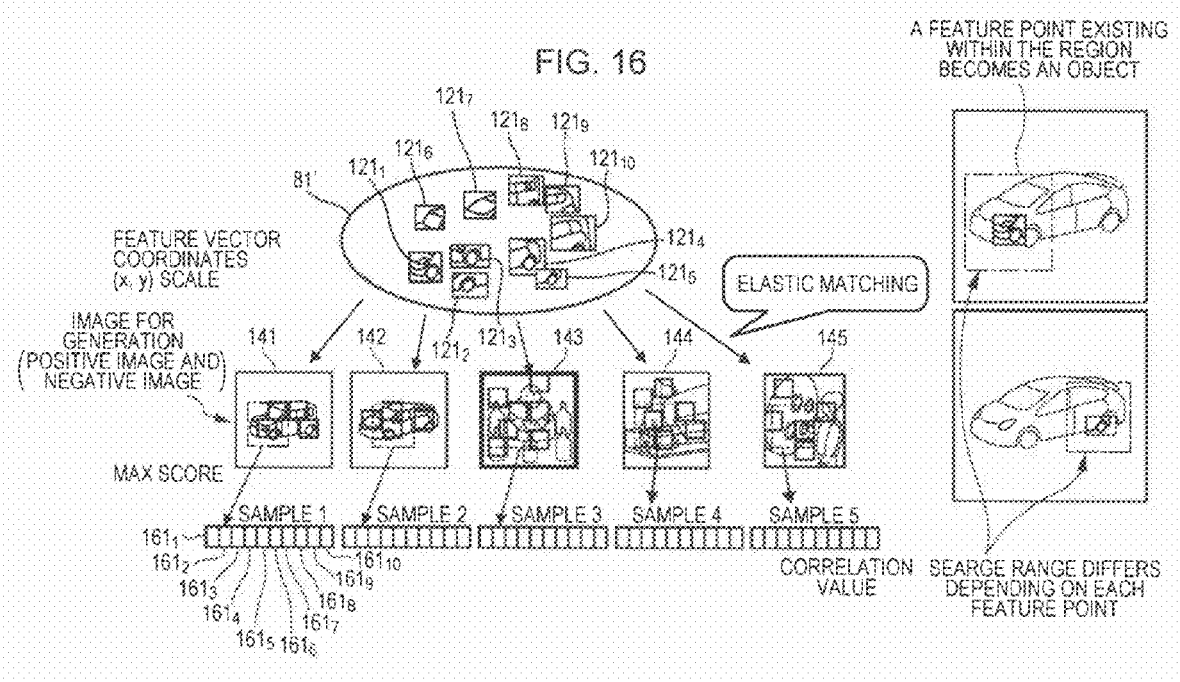

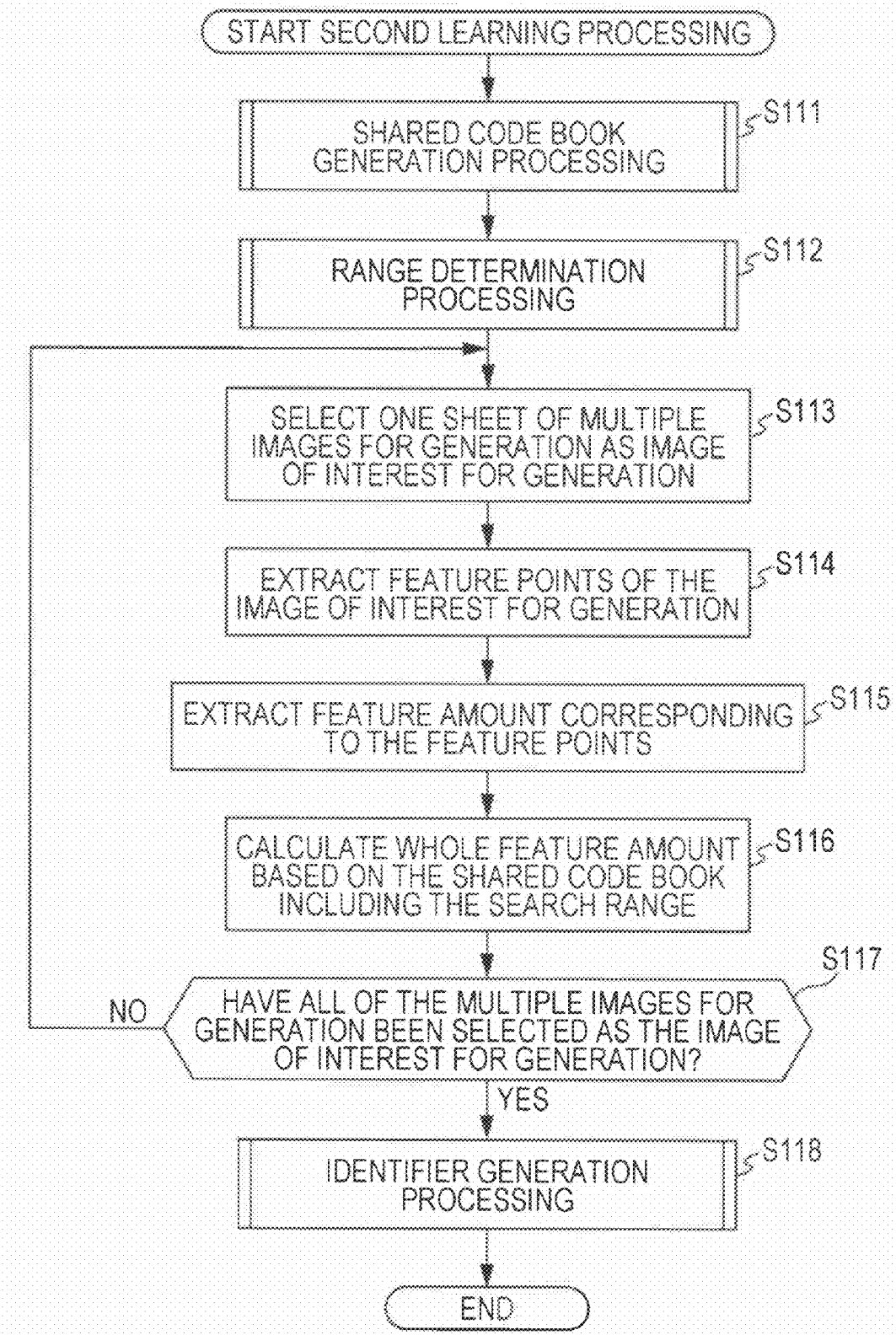

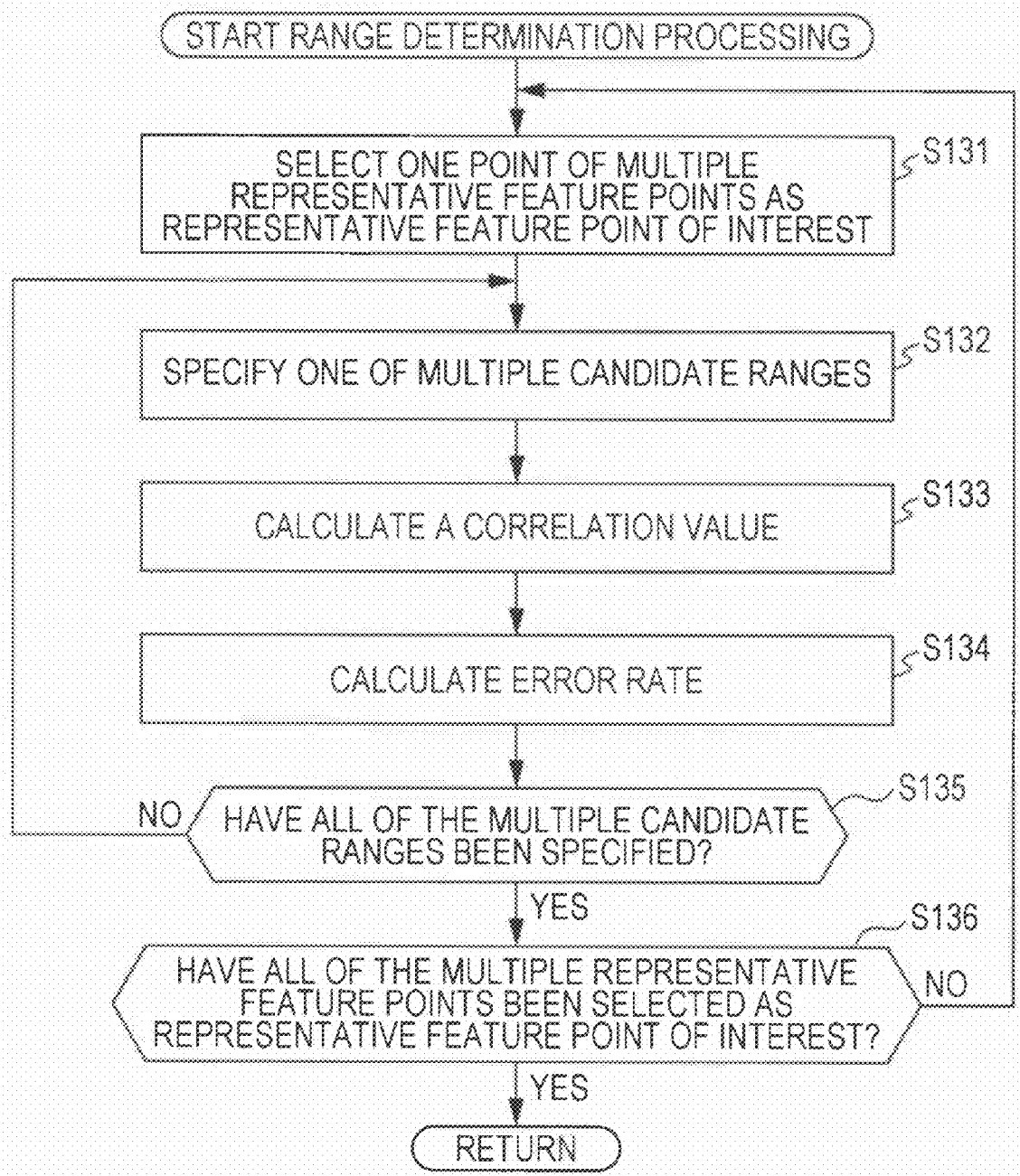

LEARNING DEVICE, LEARNING METHOD, IDENTIFYING DEVICE, IDENTIFYING METHOD, AND PROGRAM

BACKGROUND OF THE INVENTION

Field of the Invention

The present invention relates to a learning device, a learning method, an identifying device, an identifying method, and a program, and specifically relates to a learning device, a learning method, an identifying device, an identifying method, and a program, which are suitably employed in the event of identifying whether or not a subject existing on an image is a predetermined object to be identified.

There has been an identifying method for performing matching employing a template in which an object to be identified is described in a large sense, as an identifying method according to the related art for identifying (recognizing) from an image obtained by a camera an object serving as an object to be identified existing on the image thereof.

With this identifying method, a template in which an object to be identified is described in a large sense, and specifically, a template of the texture of the whole of an object to be identified is prepared beforehand, and matching is performed between the template thereof and an image to be identified (image to be processed).

However, with matching employing a template in which an object to be identified is described, it is difficult to handle partial hiding or distortion of the object to be identified existing on an image to be processed.

Therefore, an identifying method has been proposed wherein attention is paid to a local region of an image to be processed, feature amount is extracted from each local region is extracted, and combination of the feature amount of each local region (group of the feature amount of a local region), i.e., for example, a vector with the feature amount of each local region as an element, is employed to perform identification.

According to the identifying method employing a group of the feature amount of a local region, a problem such as partial hiding or distortion of an object to be identified, which has been hard to handle by the identifying method employing a template in which an object to be identified is described in a large sense, is eliminated to some extent, and accordingly, high-precision identification can be performed.

The feature amount of a local region is also used for identification of the category of an object in addition to identification of an individual object. For example, an identifying method for identifying a particular category such as a human face using the feature amount of a local region has been proposed (e.g., see P. Viola, M. Jones, Robust Real-time Face Detection, cvpr2001).

Also, with identification of a category, various identifying methods have been proposed. Examples of identifying methods proposed for identifying of a category include an identifying method employing a BoF (Bag of Features) histogram (e.g., see G. Csurka, C. Bray, C. Dance, and L. Fan. Visual categorization with bags of keypoint, ECCV2004), and an identifying method employing correlation of feature amount (e.g., see Japanese Unexamined Patent Application Publication No. 2007-128195).

For example, with the identifying method employing a BoF histogram, representative feature amount called as Visual codebook is employed, thereby suppressing the dimensions of image expression.

However, in the event of employing such Visual codebook, the information of the appearance position of the feature amount in an image region is lost, and accordingly, deterioration in identifying precision may result.

Therefore, in order to deal with such a problem, there has been proposed a method for providing weak position constraint by dividing an image region in a grid (lattice) shape (e.g., see S. Lazebnik, C. Schmid, J. Ponce "Beyond Bags of Features: Spatial Pyramid Matching for Recognizing Natural Scene Categories", CVPR2006).

SUMMARY OF THE INVENTION

However, even if the dimension of image expression is suppressed using the above Visual code book, in the event of applying this to identification of multiple categories (multiple classes), a feature amount pool that is a group of a plurality of feature amounts to be used for identification of the categories by category has to be created, and in the event that the number of the categories increases, the feature amount corresponding to each category becomes very great.

Therefore, in the event of performing identification of categories using the Visual code book, for example, the capacity of memory for storing the Visual code book increases.

Also, with the method for providing weak position restraint by dividing an image region in a grid shape, position restraint is common to each category, so precision for identifying an object to be identified deteriorates.

In this case, in order to suppress deterioration in precision of identification, the precision of identification has to be improved by generating a Visual code book inherent in each category to improve the precision of identification, so the feature amount becomes very great, and consequently, the capacity of memory for storing the Visual code book also increases.

It has been found to be desirable to share feature amount to be used for identification of an individual object or the category of an object to be identified between objects to be identified, thereby detecting an object to be identified with high precision while suppressing increase in the feature amount.

A learning device according to a first embodiment of the present invention is a learning device including: a feature point extracting unit configured to extract a feature point from each of a plurality of images for generation to be used for generating an identifier for identifying whether or not a subject existing on an image is a predetermined object to be identified, which are made up of a positive image where the object to be identified exists, and a negative image where the object to be identified does not exist; a feature point feature amount extracting unit configured to extract feature point feature amount representing the feature of the feature point from the image for generation; a whole feature amount calculating unit configured to calculate the whole feature amount representing the feature of the whole of the image for generation from the feature point feature amount of the image for generation based on a shared code book including feature amount for generation to be commonly used for generation of an identifier for identifying each of different objects to be identified; and an identifier generating unit configured to generate the identifier based on the whole feature amount of the image for generation, and a correct answer label representing whether the image for generation is the positive image or the negative image.

With the learning device according to the first embodiment, there may further be provided a shared code book storage unit configured to store a shared code book configured of a code book which holds each of a plurality of the feature amounts for generation in a manner correlated with a discriminator for discriminating the feature amount for generation, and shared information that is a plurality of shared information created for each identifier for identifying each of different objects to be identified, and also includes the discriminator of the feature amount for generation to be used at the time of calculating the whole feature amount, of the plurality of feature amounts for generation; with the whole feature amount calculating unit calculating the whole feature amount using feature amount for generation correlated with the discriminator included in the shared information created regarding the identifier to be generated by the identifier generating unit, of the plurality of feature amounts for generation held in the code book.

With the learning device according to the first embodiment, predetermined shared information of the plurality of shared information may have the same discriminator as the discriminator included in other shared information.

With the learning device according to the first embodiment, the predetermined shared information may have the discriminator also correlated with a feature point extracted from a model image that is the positive image; with the whole feature amount calculating unit calculating the whole feature amount using feature amount for generation correlated with the discriminator, and the feature point feature amount of a feature point existing on a range determined based on the feature point correlated with the identifier, of the whole range on the image for generation.

With the learning device according to the first embodiment, the discriminator included in the predetermined shared information may be correlated with a feature point different from a feature point correlated with the same discriminator as the discriminator included in the other shared information.

With the learning device according to the first embodiment, there may further be provided a model image feature point extracting unit configured to extract a feature point from a model image that is the positive image; and a quantizing unit configured to quantize the feature point based on a frequency distribution in feature points of the model image; with the shared information having the discriminator correlated with the feature point after quantization.

With the learning device according to the first embodiment, the whole feature amount calculating unit may calculate a correlation value representing correlation between the feature amount for generation included in the shared code book, and the feature point feature amount of the image for generation as the whole feature amount.

With the learning device according to the first embodiment, the identifier generating unit may generate, of a plurality of dimensional feature amounts that is each dimensional element of the whole feature amount to be represented with a plurality of dimensional vectors, the identifier for performing identification using the dimensional feature amount that reduces an error value representing a degree of mistaking identification of the positive image and the negative image, and dimensional information representing the dimension of the dimensional feature amount that reduces the error value.

A learning method according to the first embodiment of the present invention is a learning method of a learning device for learning an identifier for identifying a predetermined object to be identified, with the learning device including a feature point extracting unit, a feature point feature amount extracting unit, a whole feature amount calculating unit, and an identifier generating unit, the learning method including the steps of: extracting, with the feature point extracting unit, a feature point from each of a plurality of images for generation to be used for generating an identifier for identifying whether or not a subject existing on an image is a predetermined object to be identified, which are made up of a positive image where the object to be identified exists, and a negative image where the object to be identified does not exist; extracting, with the feature point feature amount extracting unit, feature point feature amount representing the feature of the feature point from the image for generation; calculating, with the whole feature amount calculating unit, the whole feature amount representing the feature of the whole of the image for generation from the feature point feature amount of the image for generation based on a shared code book including feature amount for generation to be commonly used for generation of an identifier for identifying each of different objects to be identified; and generating, with the identifier generating unit, the identifier based on the whole feature amount of the image for generation, and a correct answer label representing whether the image for generation is the positive image or the negative image.

A first program according to the first embodiment of the present invention is a program causing a computer to serve as: a feature point extracting unit configured to extract a feature point from each of a plurality of images for generation to be used for generating an identifier for identifying whether or not a subject existing on an image is a predetermined object to be identified, which are made up of a positive image where the object to be identified exists, and a negative image where the object to be identified does not exist; a feature point feature amount extracting unit configured to extract feature point feature amount representing the feature of the feature point from the image for generation; a whole feature amount calculating unit configured to calculate the whole feature amount representing the feature of the whole of the image for generation from the feature point feature amount of the image for generation based on a shared code book including feature amount for generation to be commonly used for generation of an identifier for identifying each of different objects to be identified; and an identifier generating unit configured to generate the identifier based on the whole feature amount of the image for generation, and a correct answer label representing whether the image for generation is the positive image or the negative image.

According to the first embodiment of the present invention, a feature point is extracted from each of a plurality of images for generation to be used for generating an identifier for identifying whether or not a subject existing on an image is a predetermined object to be identified, which are made up of a positive image where the object to be identified exists, and a negative image where the object to be identified does not exist, feature point feature amount representing the feature of the feature point is extracted from the image for generation, the whole feature amount representing the feature of the whole of the image for generation is calculated from the feature point feature amount of the image for generation based on a shared code book including feature amount for generation to be commonly used for generation of an identifier for identifying each of different objects to be identified, and the identifier is generated based on the whole feature amount of the image for generation, and a correct answer label representing whether the image for generation is the positive image or the negative image.

An identifying device according to a second embodiment of the present invention is an identifying device including: a feature point extracting unit configured to extract a feature point from an image to be processed serving as a processing object for identifying whether or not a subject existing on an image is a predetermined object to be identified; a feature point feature amount extracting unit configured to extract feature point feature amount representing the feature of the feature point from the image to be processed; a whole feature amount calculating unit configured to calculate the whole feature amount representing the feature of the whole of the image to be processed from the feature point feature amount of the image for to be processed, based on a shared code book including feature amount for generation to be commonly used for generation of an identifier for identifying each of different objects to be identified; and an identifying unit configured to identify, based on an identifier for identifying whether or not a subject existing on an image is a predetermined object to be identified, and the whole feature amount, whether or not a subject existing on the image to be processed is a predetermined object to be identified.

With the identifying device according to the second embodiment, there may further be provided a shared code book storage unit configured to store a shared code book configured of a code book which holds each of a plurality of the feature amounts for generation in a manner correlated with a discriminator for discriminating the feature amount for generation, and shared information that is a plurality of shared information created for each identifier for identifying each of different objects to be identified, and also includes the discriminator of the feature amount for generation to be used at the time of calculating the whole feature amount, of the plurality of feature amounts for generation; with the whole feature amount calculating unit calculating the whole feature amount using feature amount for generation correlated with the discriminator included in the shared information created regarding the identifier to be used by the identifying unit, of the plurality of feature amounts for generation held in the code book.

With the identifying device according to the second embodiment, predetermined shared information of the plurality of shared information may have the same discriminator as the discriminator included in other shared information.

With the identifying device according to the second embodiment, the predetermined shared information may have the discriminator also correlated with a feature point extracted from a model image on which the predetermined object to be identified exists; with the whole feature amount calculating unit calculating the whole feature amount using feature amount for generation correlated with the discriminator, and the feature point feature amount of a feature point existing on a range determined based on the feature point correlated with the discriminator, of the whole range on the image to be processed.

With the identifying device according to the second embodiment, the discriminator included in the shared information may be correlated with a feature point different from a feature point correlated with the same discriminator as the discriminator included in the other shared information.

With the identifying device according to the second embodiment, the whole feature amount calculating unit may calculate a correlation value representing correlation between the feature amount for generation included in the shared code book, and the feature point feature amount of the image to be processed as the whole feature amount.

With the identifying device according to the second embodiment, the whole feature amount calculating unit may calculate the whole feature amount representing the whole of the image to be processed, which is made up of a plurality of dimensional feature amounts, from the feature point feature amount of the image to be processed based on the shared code book; with the identifying unit identifying whether or not a subject existing on the image to be processed is a predetermined object to be identified by providing predetermined dimensional feature amount of the plurality of dimensional feature amounts making up the whole feature amount to an identifier for identifying whether or not the subject exiting on the image is a predetermined object to be identified, as input.

With the identifying device according to the second embodiment, the identifying unit may identify whether or not a subject appears on the image to be processed is a predetermined object to be identified by providing the dimensional feature amount of the dimension represented by dimensional information, of the plurality of dimensional feature amounts making up the whole feature amount, to an identifier for identifying whether or not a subject existing on an image is a predetermined object to be identified, as input; with the identifier performing identification using, of the plurality of dimensional information representing the whole feature amount, the dimensional feature amount that reduces an error value representing a degree of mistaking identification regarding whether the object to be identified is a positive image existing on an image, or a negative image not existing on the image; and with the dimensional information representing the dimension of the dimensional feature amount that reduces the error value.

An identifying method according to the second embodiment of the present invention is an identifying method of an identifying device for identifying whether or not a subject appearing on an image is a predetermined object to be identified, with the identifying device including a feature point extracting unit, a feature point feature amount extracting unit, a whole feature amount calculating unit, and an identifying unit, the identifying method including the steps of: extracting, with the feature point extracting unit, a feature point from an image to be processed serving as a processing object for identifying whether or not a subject existing on an image is a predetermined object to be identified; extracting, with the feature point feature amount extracting unit, feature point feature amount representing the feature of the feature point from the image to be processed; calculating, with the whole feature amount calculating unit, the whole feature amount representing the feature of the whole of the image to be processed from the feature point feature amount of the image to be processed, based on a shared code book including feature amount for generation to be commonly used for generation of an identifier for identifying each of different objects to be identified; and identifying, with the identifying unit, whether or not a subject existing on the image to be processed is a predetermined object to be identified, based on an identifier for identifying whether or not a subject exiting on an image is a predetermined object to be identified, and the whole feature amount.

A second program according to the second embodiment of the present invention is a program causing a computer to serve as: a feature point extracting unit configured to extract a feature point from an image to be processed serving as a processing object for identifying whether or not a subject existing on an image is a predetermined object to be identified; a feature point feature amount extracting unit configured to extract feature point feature amount representing the feature of the feature point from the image to be processed; a whole feature amount calculating unit configured to calculate the whole feature amount representing the feature of the whole of the image to be processed from the feature point feature amount of the image to be processed, based on a shared code book including feature amount for generation to be commonly used for generation of an identifier for identifying each of different objects to be identified; and an identifying unit configured to identify whether or not a subject existing on the image to be processed is a predetermined object to be identified, based on an identifier for identifying whether or not a subject exiting on an image is a predetermined object to be identified, and the whole feature amount.

According to the second embodiment of the present invention, a feature point is extracted from an image to be processed serving as a processing object for identifying whether or not a subject existing on an image is a predetermined object to be identified, feature point feature amount representing the feature of the feature point is extracted from the image to be processed, the whole feature amount representing the feature of the whole of the image to be processed is calculated from the feature point feature amount of the image to be processed based on a shared code book including feature amount for generation to be commonly used for generation of an identifier for identifying each of different objects to be identified, and whether or not a subject existing on the image to be processed is a predetermined object to be identified is identified based on an identifier for identifying whether or not a subject exiting on an image is a predetermined object to be identified, and the whole feature amount.

According to the present invention, in the event of identifying whether or not a subject existing on an image is a predetermined object to be identified, an object to be identified can be detected in a more accurate manner while suppressing increase in feature amount to be used for identification.

BRIEF DESCRIPTION OF THE DRAWINGS

FIG. 1 is a block diagram illustrating a first configuration example of a learning device to which an embodiment of the present invention has been applied;

FIG. 2 is a block diagram illustrating a configuration example of a shared code book generating unit;

FIG. 3 is a diagram for describing an example of processing to be performed by a feature amount replacing unit and a quantizing unit;

FIG. 4 is a diagram illustrating an example of a shared code book;

FIG. 6 is a diagram for describing an example of processing to be performed by the whole feature amount calculating unit in FIG. 1;

FIG. 7 is a diagram for describing an example of an identifier generating method;

FIG. 8 is a flowchart for describing learning processing to be performed by the learning device in FIG. 1;

FIG. 10 is a flowchart for describing code book generation processing;

FIG. 11 is a flowchart for describing identifier generation processing;

FIG. 12 is a block diagram illustrating a configuration example of a first identifying device for identifying an object to be identified using an identifier generated by learning of the learning device in FIG. 1;

FIG. 13 is a flowchart for describing identification processing to be performed by the identifying device in FIG. 12;

FIG. 14 is a block diagram illustrating a second configuration example of a learning device to which an embodiment of the present invention has been applied;

FIG. 15 is a diagram for describing an example of processing to be performed by a range determining unit;

FIG. 16 is a diagram for describing an example of processing to be performed by the whole feature amount calculating unit in FIG. 14;

FIG. 17 is a flowchart for describing learning processing to be performed by the learning device in FIG. 14;

FIG. 18 is a flowchart for describing range determination processing;

DESCRIPTION OF THE PREFERRED EMBODIMENTS

Figure 5A:
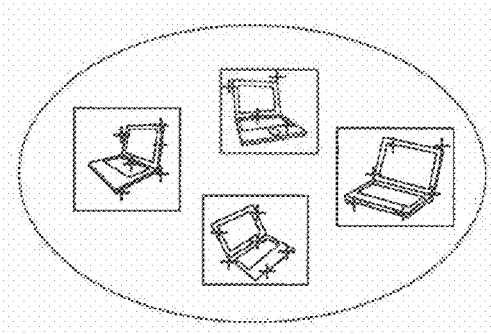
FIGS. 5A through 5C are diagrams for describing an example of processing to be performed by the quantizing unit.

Hereafter, modes (hereafter, referred to as embodiments) for carrying out the present invention will be described. Note that description will be made in the following sequence.
1. First Embodiment (example in which feature point feature amount is commonly used by a different object to be identified)
2. Second Embodiment (example in which a different range is used for each object to be identified)
3. Modifications First Embodiment Configuration Example of Learning Device 1

FIG. 1 illustrates a configuration example of a learning device 1 to which a first embodiment of the present invention has been applied.

This learning device 1 uses an image for learning to generate an identifier (function) for identifying whether or not a subject existing on the image is a predetermined object to be identified, and later-described dimensional information.

Here, the image for learning is an image to be used for generation (learning) of an identifier, and includes multiple model images, multiple primitive images, and multiple images for generation.

The model images are images on which a subject that can be served as an object to be identified (e.g., note-type personal computer (notebook computer), automobile, etc.) exists. Also, the primitive images are images including a plurality of feature amounts not depending on a particular object to be identified, i.e., images to be used for extracting various types of feature amount regardless of the feature amount of a particular object to be identified.

As for an example of the primitive images, an image on which an artificial object or natural object such as scenery exists is employed.

Also, the images for generation include both of a positive image on which an object (e.g., notebook computer) to be identified exists, and a negative image on which an object to be identified does not exist.

Further, the images for generation have added thereto a correct answer label. This correct answer label exists for each image for generation, and represents whether each image for generation is either a positive image or a negative.

Specifically, this learning device 1 generates a shared code book wherein the feature amount extracted from multiple primitive images is shared as the feature amount of a subject (e.g., notebook computer, automobile, etc.) that can be served as an object to be identified.

Subsequently, the learning device 1 uses the generated shared code book to generate an identifier for identifying whether or not a subject existing on an image is a predetermined object to be identified (e.g., automobile), and the corresponding dimensional information.

The learning device 1 is configured of an input unit 21, a shared code book generating unit 22, a shared code book storage unit 23, a feature point extracting unit 24, a feature amount extracting unit 25, a whole feature amount calculating unit 26, and an identifier generating unit 27.

Multiple model images, multiple primitive images, and multiple images for generation are supplied to the input unit 21 as images for learning. The input unit 21 inputs (supplies) the supplied multiple model images and multiple primitive images to the shared code book generating unit 22.

Also, the input unit 21 inputs the supplied multiple images for generation to the feature point extracting unit 24.

The shared code book generating unit 22 generates a shared code book where the feature amount of a subject that can be served as an object to be identified is shared, based on the multiple model images and multiple primitive images from the input unit 21, and supplies and stores this to the shared code book storage unit 23.

Note that the details of the shared code book generating unit 22 will be described later with reference to FIG. 2.

The shared code book storage unit 23 stores the shared code book from the shared code book generating unit 22.

The feature point extracting unit 24 sequentially selects each of the multiple images for generation from the input unit 21 as an image for generation of interest, and extracts a feature point from the image for generation of interest. Subsequently, the feature point extracting unit 24 supplies the extracted feature point to the feature amount extracting unit 25 along with the image for generation of interest.

Here, the local information of an image is frequently included in a corner point, so the feature point extracting unit 24 extracts (a pixel serving as) a corner point as a feature point.

Extraction of a corner point can be performed using a Harris corner detector. With the Harris corner detector, if we say that the pixel value (e.g., luminance) of the pixel of a certain position (x, y) is represented with I(x, y), a pixel of which the two eigen values of the secondary moment L of a luminance gradient obtained by the following Expression (1) are equal to or greater than a predetermined threshold is detected as a corner point.

$$L = \begin{bmatrix} \left(\frac{\partial I}{\partial x}\right)^2 & \left(\frac{\partial I}{\partial x}\right)\left(\frac{\partial I}{\partial y}\right) \\ \left(\frac{\partial I}{\partial x}\right)\left(\frac{\partial I}{\partial y}\right) & \left(\frac{\partial I}{\partial y}\right)^2 \end{bmatrix} \quad (1)$$

Note that, in Expression (1), the pixel value I(x, y) is described as I by omitting (x, y).

Also, with the feature point extracting unit 24, in addition to a corner point, for example, a pixel serving as an edge, a pixel in a predetermined fixed position, or the like may be employed as a feature point.

The feature amount extracting unit 25 extracts feature point feature amount representing the feature of a feature point from the feature point extracting unit 24 from the image for generation of interest from the feature point extracting unit 24, and supplies this to the whole feature amount calculating unit 26. Also, the feature amount extracting unit 25 extracts the correct answer label added to the image for generation of interest from the feature point extracting unit 24, and supplies this to the whole feature amount calculating unit 26.

The whole feature amount calculating unit 26 calculates whole feature amount representing the feature of the whole of the image for generation of interest thereof from the feature point feature amount from the feature amount extracting unit 25 based on the shared code book stored in the shared code book storage unit 23.

Here, the whole feature amount is represented with, for example, multiple dimensional vectors (vectors including multiple values as an element).

The whole feature amount calculating unit 26 supplies the whole feature amount of the calculated image for generation of interest to the identifier generating unit 27 along with the correct answer label of the image for generation of interest from the feature amount extracting unit 25.

In response to the corresponding whole feature amount and correct answer label regarding each of the multiple images for generation from the whole feature amount calculating unit 26, the identifier generating unit 27 uses the whole feature amount of each of the multiple images for generation, and the correct answer label of each of the multiple images for generation to generate an identifier (perform learning to calculate a parameter to stipulate an identifier).

Here, if we say that the elements of the multiple dimensional vectors serving as the whole feature amount are taken as dimensional feature amount, the whole feature amount is made up of a plurality (a number equal to the dimension of vector) of dimensional feature amount.

The identifier generating unit 27 generates an identifier which uses not the entire dimensional feature amount making up the whole feature amount but part of the dimensional feature amount selected out of the dimensional feature amount making up the whole feature amount to perform identification.

Also, the identifier generating unit 27 generates information representing the dimension of the dimensional feature amount to be used for identification by this identifier (information representing what number element of vector serving as the whole feature amount the dimensional feature amount is) as dimensional information.

Configuration Example of Shared Code Book Generating Unit 22

FIG. 2 illustrates a detailed configuration example of the shared code book generating unit 22.

This shared code book generating unit 22 is configured of a feature point extracting unit 41, a feature amount extracting unit 42, a code book generating unit 43, a code book storage unit 44, a feature point extracting unit 45, a feature point extracting unit 46, a feature amount replacing unit 47, and a quantizing unit 48.

The multiple primitive images are input from the input unit 21 to the feature point extracting unit 41. The feature point extracting unit 41 sequentially takes each of the multiple primitive images from the input unit 21 as a primitive image of interest. Subsequently, the feature point extracting unit 41 extracts a feature point from the primitive image of interest, and supplies this to the feature amount extracting unit 42 along with the primitive image of interest.

The feature amount extracting unit 42 similarly extracts feature point feature amount representing the feature of the feature point from the feature point extracting unit 41 from the primitive image of interest from the feature point extracting unit 41 to supply this to the code book generating unit 43.

Specifically, the feature amount extracting unit 42 supplies the plurality of feature point amounts extracted from each of the multiple primitive images to be selected as a primitive image of interest at the feature point extracting unit 41 to the code generating unit 43.

The code book generating unit 43 subjects the plurality of feature point feature amounts to be supplied from the feature amount extracting unit 42 to grouping into several groups, for example, by a clustering method such as the k-means method in the feature amount space. Subsequently, the code book generating unit 43 determines, for every several groups to be obtained by grouping, the centroid of feature point feature amount belonging to the groups thereof as feature point feature amount representing the groups.

The code book generating unit 43 correlates the feature point feature amount determined for every several groups with a discriminator $Cbn (n=1, 2, \ldots, N)$ for uniquely identifying the feature point feature amount thereof. Also, the code book generating unit 43 generates a code book including the feature point feature amount correlated with the discriminator Cbn to supply and store this to the code book storage unit 44.

The code book storage unit 44 stores the code book in which the discriminator Cbn and the feature point feature amount to be identified by the discriminator Cbn are correlated.

The multiple model images are input to the feature point extracting unit 45 from the input unit 21. The feature point extracting unit 45 subjects the multiple model images to be input from the input unit 21 to grouping into multiple groups by the category of a subject existing on the model images. Note that the model images include category information representing the category of a subject existing on the images, and the feature point extracting unit 45 is arranged to perform grouping based on the category information included in the model images.

Subsequently, the feature point extracting unit 45 sequentially selects each of the multiple groups grouped by category as a group of interest.

Further, the feature point extracting unit 45 sequentially selects each of the multiple images included in the group of interest as a model image of interest. Subsequently, the feature point extracting unit 45 extracts a feature point from the model image of interest to supply this to the feature amount extracting unit 46 along with the model image of interest.

The feature amount extracting unit 46 similarly extracts feature point feature amount representing the feature of the feature point from the feature point extracting unit 45 from the model image of interest from the feature point extracting unit 45. Subsequently, the feature amount extracting unit 46 correlates the feature point from the feature point extracting unit 45 with the extracted feature point feature amount.

Thus, the feature amount extracting unit 46 obtains an initial feature amount pool including the feature point feature amount correlated with the corresponding feature point, included in the plurality of feature point feature amounts extracted from each of the multiple model images included in the group of interest.

The feature amount extracting unit 46 supplies the obtained initial feature amount pool to the feature amount replacing unit 47.

The feature amount replacing unit 47 replaces the feature point feature amount included in the initial feature amount pool from the feature amount extracting unit 46 with the discriminator Cbn included in the code book stored in the code book storage unit 44.

Specifically, for example, the feature amount replacing unit 47 reads out the code book from the code book storage unit 44. Subsequently, the feature amount replacing unit 47 replaces the feature point feature amount including the initial feature amount pool from the feature amount extracting unit 46 with the discriminator Cbn for identifying the most similar feature point feature amount of the plurality of feature point feature amounts including the read code book.

In this way, the feature amount replacing unit 47 replaces each of the plurality of feature point feature amounts included in the initial feature amount pool from the feature amount extracting unit 46 with the discriminator Cbn included in the code book stored in the code book storage unit 44.

Thus, the feature amount replacing unit 47 generates, from the initial feature amount pool including the feature point feature amount correlated with a feature point, a feature amount pool including the discriminator Cbn correlated with the feature point. The feature amount replacing unit 47 supplies the generated feature amount pool to the quantizing unit 48.

Also, the feature amount replacing unit 47 supplies the code book read out from the code book storage unit 44 to the quantizing unit 48.

The quantizing unit 48 quantizes the feature point correlated with the discriminator Cbn included in the feature pool from the feature amount replacing unit 47 to obtain a quantized feature amount pool obtained as a result thereof.

Also, the quantizing unit 48 obtains shared information to be obtained by grouping the same discriminators Cbn of the discriminators Cbn included in the obtained quantized feature amount pool.

Subsequently, the quantizing unit 48 supplies and stores a combination of the shared information obtained by category and the code book from the feature amount replacing unit 47 to the shared code book storage unit 23 as a shared code book.
Example of Processing to be Performed by Feature amount Replacing Unit 47 and Quantizing Unit 48

Next, FIG. 3 illustrates an example of processing to be performed by the feature amount replacing unit 47 and quantizing unit 48.

Note that the code book 61 illustrated in FIG. 3 is a code book stored in the code book storage unit 44, and includes the discriminator Cbn and feature point feature amount fvec to be identified by the discriminator Cbn.

The feature amount replacing unit 47 reads out the code book 61 from the code book storage unit 44. Also, the feature amount replacing unit 47 extracts predetermined feature point feature amount from an initial feature amount pool 62 including the plurality of feature point feature amounts in a predetermined category (illustrated with a cross) to be supplied from the feature amount extracting unit 46 to sequentially select this as feature point feature amount of interest fvec'.

Subsequently, the feature amount replacing unit 47 replaces the feature point feature amount of interest fvec' with the discriminator Cbn included in the read code book 61. Specifically, for example, the feature amount replacing unit 47 replaces the feature point feature amount of interest fvec' with the discriminator Cbn for identifying the feature point feature amount fvec most similar to the feature point feature amount of interest fvec' of the plurality of feature point feature amounts included in the read code book 61.

The feature amount replacing unit 47 replaces all of the plurality of feature point feature amounts included in the initial feature amount pool 62 with the discriminator Cbn by selecting all of the plurality of feature point feature amounts included in the initial feature amount pool 62 as the feature point feature amount of interest fvec'.

Thus, the feature amount replacing unit 47 converts the initial feature amount pool 62 in which the feature point feature amount of interest fvec' is correlated with the corresponding feature point (x, y) into a feature amount pool 63 in which the discriminator Cbn is correlated with the feature point (x, y) corresponding to the feature point feature amount of interest fvec'.

The feature amount replacing unit 47 supplies the converted feature amount pool 63 to the quantizing unit 48 along with the code book 61 read out from the code book storage unit 44.

The quantizing unit 48 performs quantization to convert several feature points included in the feature amount pool 63 from the feature amount replacing unit 47 into one feature point, and obtains a quantized feature amount pool 64 obtained as a result thereof. Note that the details of the quantization to be performed by the quantizing unit 48 will be described later with reference to FIG. 4.

Also, the quantizing unit 48 groups the same discriminators Cbn of the discriminators Cbn included in the obtained quantized feature amount pool 64, and supplies and stores shared information 65 to be obtained as a result thereof to the shared code book storage unit 23.

Specifically, for example, the quantizing unit 48 groups the feature point with which the same discriminators Cbn are correlated of the discriminators Cbn included in the quantized feature amount pool 64, thereby generating shared information 65 with which a single or multiple feature points are correlated, for every discriminator Cbn.

Subsequently, the quantizing unit 48 supplies and stores a combination between the generated shared information 65 and the code book 61 from the feature amount replacing unit 47 to the shared code book storage unit 23 as a shared code book 81.

Note that the shared information 65 is generated for every multiple categories based on the initial feature amount pool 62 in the category thereof. Accordingly, a shared code book 81 configured of shared information $65_m$ generated for every multiple categories, and the code book 61 is stored in the shared code book storage unit 23.

Also, as described above, the quantizing unit 48 has been arranged to obtain the shared information 65 by grouping the same discriminators Cbn of the discriminators Cbn included in the quantized feature amount pool 64, but is not restricted to this.

Specifically, for example, the quantizing unit 48 can obtain the shared information 65 by grouping the same discriminators Cbn of the discriminators Cbn included in not the quantized feature amount pool 64 but the feature amount pool 63 without quantizing the feature amount pool 63 from the feature amount replacing unit 47.

Example of Shared Code Book

Next, FIG. 4 illustrates an example of the shared code book 81 to be stored in the shared code book 81 generated by the shared code book generating unit 22 and stored in the shared code book storage unit 23.

The shared code book 81 illustrated in FIG. 4 is made up of shared information $65_1$ in a category A to which a notebook personal computer belongs, and shared information $65_2$ in category B to which an automobile belongs.

The shared information $65_1$ is shared information generated based on the initial feature amount pool 62 including the plurality of feature point feature amounts in the category A.

With the shared information $65_1$, a discriminator $Cb_1$ is correlated with feature points $(x_1, y_1)$ and $(x_2, y_2)$. Also, with the shared information $65_1$, a discriminator $Cb_{30}$ is correlated with a feature point $(x_3, y_3)$.

The shared information $65_2$ is shared information generated based on the initial feature amount pool 62 including the plurality of feature point feature amounts in the category B.

With the shared information $65_2$, a discriminator $Cb_{30}$ is correlated with feature points $(x_4, y_4)$ and $(x_5, y_5)$. Also, with the shared information $65_2$, a discriminator $Cb_{45}$ is correlated with feature points $(x_6, y_6)$ and $(x_7, y_7)$.

Specifically, with a combination 61a between the feature point feature amount fvec and the discriminator $Cb_{30}$ for identifying the feature point feature amount fvec, the discriminator $Cb_{30}$ of the combination 61a is correlated with the feature point $(x_3, y_3)$ in the category A, and the feature points $(x_6, y_6)$ and $(x_7, y_7)$ in the category B.

Accordingly, even in either case of the case of identifying category A, and the case of identifying category B, the feature point feature amount fvec to be identified by the discriminator $Cb_{30}$ is commonly employed.

Also, for example, a feature point extracted from a model image in the category A, and a feature point extracted from a model image in the category B generally differ. Therefore, the feature point $(x_3, y_3)$ correlated with the discriminator $Cb_{30}$ in the category A, and the feature points $(x_4, y_4)$ and $(x_5, y_5)$ correlated with the discriminator $Cb_{30}$ in the category B differ.

Accordingly, in the event of identifying the category A, and in the event of identifying the category B, a different feature point is employed.

Example of Quantization to be Performed by Quantizing Unit 48

Figure 5B:
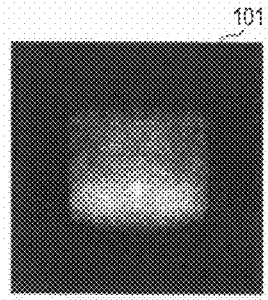
Figure 5C:
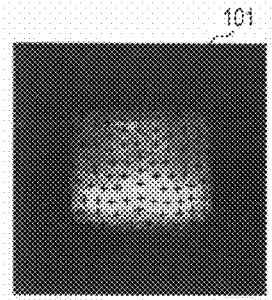

Next, the details of the quantization to be performed by the quantizing unit 48 will be described with reference to FIGS. 5A through 5C. FIGS. 5A through 5C are diagrams for describing the details of quantization to be performed by the quantizing unit 48.

FIG. 5A illustrates, for example, four model images on which a notebook personal computer exits as a subject. Note that, with the four model images illustrated in FIG. 5A, a corner point (illustrated with a cross) is illustrated as a feature point for example.

FIG. 5B illustrates a feature point frequency image 101 configured of a pixel with a frequency (degree) of a feature point existing as a luminance value in the four model images illustrated in FIG. 5A.

FIG. 5C illustrates an example of a scene wherein a pixel with a greater luminance value than those of peripheral pixels has been selected as a feature point (illustrated with a cross) in the feature point frequency image 101 illustrated in FIG. 5B.

The quantizing unit 48 sequentially selects a feature point included in the feature amount pool 63 from the feature amount replacing unit 47, i.e., for example, each of corner points (illustrated with a cross) of each of the model images illustrated in FIG. 5A, as a feature point of interest.

Also, with the quantizing unit 48, there is prepared the feature point frequency image 101 having the same size as the model images illustrated in FIG. 5A, and each pixel of which has a luminance value of zero.

Subsequently, the quantizing unit 48 votes (adds) a value corresponding to Gauss weight (weight following a gauss distribution) to the pixel corresponding to the feature point of interest, and the luminance value of a pixel around that pixel, of multiple pixels making up the prepared feature point frequency image 101.

Thus, with the feature point frequency image 101, 1 is voted to the luminance value of the pixel corresponding to the feature point of interest, and a smaller value is voted to a pixel existing in a position apart from the position of that pixel as the distance therebetween becomes longer.

The quantizing unit 48 performs a vote by selecting all of the feature points included in the feature amount pool 63 as a feature point of interest, thereby generating the feature point frequency image 101 with a feature point having different luminance according to a frequency where the feature point exists.

Subsequently, the quantizing unit 48 performs non-maximum suppression processing wherein a feature point corresponding to a pixel having a greater luminance value than that of a peripheral pixel is extracted as a representative feature point as to the generated feature point frequency image 101.

Specifically, for example, the quantizing unit 48 extracts, of the luminance values of pixels making up the feature point frequency image 101, the position of a pixel having the maximum luminance value as a representative feature point. Subsequently, the quantizing unit 48 excludes the region around the representative feature point thereof including the extracted representative feature point from a processing object to extract a new representative feature point.

Next, the quantizing unit 48 extracts, of the luminance value of a pixel making up the feature point frequency image 101 after exclusion of the region around the extracted representative feature point from the processing object, the position of a pixel having the maximum luminance value as a representative feature point. Subsequently, the quantizing unit 48 excludes the region around the representative feature point thereof including the extracted representative feature point from the processing object, and thereafter the same processing is repeated.

In this way, in the event of having extracted a predetermined representative feature points (illustrated with a cross) from the feature point frequency image 101 as illustrated in FIG. 5C, the quantizing unit 48 ends the non-maximum suppression processing.

The quantizing unit 48 quantizes the feature points included in the feature amount pool 63 into one of the multiple representative feature points extracted by the non-maximum suppression processing.

Specifically, for example, the quantizing unit 48 sequentially selects the feature points included in the feature amount pool 63 as a feature point of interest. Subsequently, the quantizing unit 48 performs quantization to convert the feature point of interest into a representative feature point existing in a position closest to the feature point of interest, of the multiple representative feature points.

The quantizing unit 48 quantizes all of the feature points included in the feature amount pool 63 into one of the multiple representative feature points, and obtains a quantized feature amount pool 64 obtained by the quantization thereof.

Subsequently, the quantizing unit 48 groups the multiple discriminators Cbn included in the quantized feature amount pool 64 between the same discriminators Cbn as described above. Also, the quantizing unit 48 supplies and stores a combination between the shared information 65 to be obtained by grouping thereof, and the code book 61 from the feature amount replacing unit 47 to the shared code book storage unit 23 as the shared code book 81.

Example of Calculation of Correlation Values

Next, description will be made regarding an example of processing for calculating the whole feature amount to be performed by the whole feature amount calculating unit 26, with reference to FIG. 6.

In FIG. 6, as the whole feature amount for generating an identifier and dimensional information for identifying whether or not an object to be identified belongs to the category B of automobiles, the whole feature amount calculating unit 26 for calculating a correlation value will be described, for example.

Specifically, FIG. 6 illustrates an example in the event that the whole feature amount calculating unit 26 uses the shared information $65_2$ in the category B of automobiles, and the code book 61 in the shared code book 81 stored in the shared code book storage unit 23 to calculate the whole feature amount of an image for generation.

The upper side in FIG. 6 illustrates, of the plurality of feature point feature amounts included in the code book 61 included in the shared code book 81, feature point feature amount $121_1$ through $121_{10}$ corresponding to the discriminators Cbn included in the shared information $65_2$ respectively.

Also, the lower side in FIG. 6 illustrates images for generation 141 through 145 of which the feature points have been extracted at the feature point extracting unit 24, and the feature amount has been calculated at the feature amount extracting unit 25.

The whole feature amount calculating unit 26 calculates a correlation value between each of the feature point feature amount $121_1$ through $121_{10}$ corresponding to each of the discriminators Cbn included in the shared information $65_2$ included in the shared code book 81, and each of the images for generation 141 through 145, as a whole feature amount.

Specifically, for example, the whole feature amount calculating unit 26 takes a predetermined region (e.g., a rectangular region with the position corresponding to the feature point of the feature point feature amount $121_n$ as the center) based on the feature point corresponding to the feature point feature amount $121_n$ (n is a natural number from 1 to 10) of the whole region making up the image for generation 141, as a search range.

The whole feature amount calculating unit 26 calculates a correction value between the feature point feature amount $121_n$, and the feature point feature amount of each feature point existing on the search range of the image for generation 141, and takes the maximum correlation value of the multiple correlation values obtained by calculation thereof, as the final correlation value $161_n$ between the feature point feature amount $121_n$ and the image for generation 141.

The whole feature amount calculating unit 26 calculates correlation values $161_1$ through $161_{10}$ as to the feature point feature amount $121_1$ through $121_{10}$ regarding the image for generation 141, and takes a vector with the calculated correlation values $161_1$ through $161_{10}$ as elements, as the whole feature amount of the image for generation 141.

The whole feature amount calculating unit 26 calculates the whole feature amount of each of the images for generation 142 through 145 in the same way as with a case where the whole feature amount of the image for generation 141 has been calculated.

The whole feature amount calculating unit 26 supplies the whole feature amount of each of the multiple images for generation 141 through 145 to the identifier generating unit 27.

Processing Performed by Identifier Generating Unit 27

Next, FIG. 7 illustrates the outline of processing to be performed by the identifier generating unit 27.

The identifier generating unit 27 follows, for example, the Boosting algorithm to select (the dimension of) dimensional feature amount to be used for identifying out of dimensional feature amount making up the whole feature amount from the whole feature amount calculating unit 26, and also to generate an identifier for performing identification using the dimensional feature amount thereof.

Specifically, the identifier generating unit 27 generates, of the plurality of dimensional feature amounts (elements of a vector) making up the whole feature amount from the whole feature amount calculating unit 26 (FIG. 1), an identifier for performing identification using dimensional feature amount that reduces an error value representing a degree of mistaking identification between a positive image and a negative image, and dimensional information representing the dimension of dimensional feature amount that reduces the error value.

Specifically, now, let us say that there are multiple N images as images for generation, and at the whole feature amount calculating unit 26, as illustrated in FIG. 7, a vector serving as the whole feature amount $x_1, x_1, \ldots, x_N$ of N samples of the N images for generation has been obtained.

Further, the whole feature amount $x_i$ ($i=1, 2, \ldots, N$) is, as illustrated in FIG. 7, assumed to be an M dimensional vector having multiple M elements (dimensional feature amount) $x_{1,1}, x_{1,2}, \ldots, x_{i,M}$.

Also, as described in FIG. 1, the correct answer label is supplied from the whole feature amount calculating unit 26 to the identifier generating unit 27, but here, the correct answer label of the i'th sample $x_i$ (i'th image for generation) is represented as $y_i$. The correct answer label $y_i$ is assumed to be +1 in the event that the i'th image for generation is a positive image, and is assumed to be −1 in the event that the i'th image for generation is a negative image.

The identifier that the identifier generating unit 27 generates is a function for performing identification using dimensional feature amount $x_{i,d}$ that reduces an error value representing a degree of mistaking identification between a positive image and a negative image, of the M pieces of the dimensional feature amount $X_{1,1}$ through $x_{i,M}$ making up the whole feature amount $x_1$, and is configured of multiple weak learners $h_{t,d}(x_{i,d})$.

Here, let us say that the suffix t of the weak learners $h_{t,d}(x_{i,d})$ is a variable for counting the number of the weak learners $h_{t,d}(x_{i,d})$, and an identifier is made up of multiple T weak learners $h_{1,d}(x_{i,d}), h_{2,d}(x_{i,d}), \ldots, h_{T,d}(x_{i,d})$.

As for the number T of the weak learners $h_{t,d}(x_{i,d})$, a value equal to or smaller than M is set, for example, experientially, or so that the identification rate of identification by an identifier becomes a certain amount of value.

The weak learners $h_{t,d}(x_{i,d})$ are functions for outputting an identification result to the effect that the image for generation is a positive image or negative image with the d'th dimensional feature amount $x_{i,d}$ of the whole feature amount $x_i$ (the d'th element of the vector serving as the whole feature amount $x_i$) of the image for generation as input, and output, for example, +1 as an identification result to the effect that the image for generation is a positive image, and −1 as an identification result to the effect that the image for generation is a negative image, respectively.

Now, if we say that the error values of the identification results of the weak learners $h_{t,d}(x_{i,d})$ are represented as $\epsilon_{t,d}$, the identifier generating unit 27 determines the weak learners $h_{t,d}(x_{i,d})$ so that the error values $\epsilon_{t,d}$ become small.

Note that, in order to simplify description, as the weak learners $h_{t,d}(x_{i,d})$, a function is assumed to be employed here wherein, for example, in the event that the d'th dimensional feature amount $x_{i,d}$ that is an argument is equal to or greater than a predetermined threshold, +1 is output, which represents the identification result to the effect that the image for generation is a positive image, and in the event that the d'th dimensional feature amount $x_{i,d}$ that is an argument is less than a predetermined threshold, −1 is output, which represents the identification result to the effect that the image for generation is a negative image.

In this case, determining the weak learners $h_{t,d}(x_{i,d})$ so that the error values $\epsilon_{t,d}$ become small means to determine a threshold of the weak learners $h_{t,d}(x_{i,d})$. Of the N d'th dimensional feature amount $x_{1,d}, x_{2,d}, X_{N,d}$ that can be served as arguments, a value between the minimum value and the maximum value is determined as the threshold of the weak learners $h_{t,d}(x_{i,d})$.

The identifier generating unit 27 determines each of the weak learners $h_{t,1}(x_{1,1}), h_{t,2}(x_{1,2}), \ldots, h_{t,M}(x_{i,M})$ so as to reduce each of the error values $\epsilon_{t,1}, \epsilon_{t,2}, \ldots, \epsilon_{t,M}$, and obtains a dimension d(t) whereby the minimum value of the error values $\epsilon_{t,1}$ through $\epsilon_{t,d}$ can be obtained (hereafter, referred to as "minimum error dimension").

Also, the identifier generating unit 27 obtains weight $D_t(i)$ to cause an error of the identification result of the image for registration to affect the error value $\epsilon_{t,d}$ for each image for generation depending on whether the identification result after the i'th image for generation by the weak learners $h_{t,d}(x_{i,d})$ is matched with the correct answer label $y_i$, i.e., whether Expression $h_{t,d}(x_{i,d})=y_i$ holds or Expression $h_{t,d}(x_{i,d})\neq y_i$ holds.

Here, the error value $\epsilon_{t,d}$ is obtained by adding the weight $D_t(i)$ of an image for generation where the identification result by the weak learners $h_{t,d}(x_{i,d})$ commits an error, of the N images for generation.

The identifier generating unit 27 repeats determining of the weak learners $h_{t,d}(x_{i,d})$ so as to reduce the error value $\epsilon_{t,d}$, obtaining dimension (minimum error dimension) d(t) whereby the minimum value of the error values $\epsilon_{t,1}$ through $\epsilon_{t,M}$ of the identification result of the image for generation by the weak learners $h_{t,d}(x_{i,d})$, and obtaining of weight $D_t(i)$ to be used for calculating the error value $\epsilon_{t,d}$ by T times, thereby generating identifier H(x) made up of the T weak learners $h_{1,d}(x_{i,d}), h_{2,d}(x_{i,d}), \ldots, h_{T,d}(x_{i,d})$, and dimensional information representing the minimum error dimensions d(1), d(2), ..., d(T).

Operational Description of Learning Device 1

Next, description will be made regarding learning processing to be performed by the learning device 1 (hereafter, referred to as "first learning processing"), with reference to the flowchart in FIG. 8.

This first learning processing is started when an image for learning is supplied to the input unit 21. At this time, of an image for generation, a primitive image, and a model image, which are images for learning to be supplied, the input unit 21 supplies the primitive image and model image to the shared code book generating unit 22, and supplies the image for generation to the feature point extracting unit 24.

In step S1, the shared code book generating unit 22 performs shared code book generation processing for generating a shared code book 81 based on the primitive image and model image from the input unit 21 to store this in the shared code book storage unit 23. Note that the details of the shared code book generation processing will be described later with reference to the flowchart in FIG. 9.

In step S2, the feature point extracting unit 24 sequentially takes each of the multiple images for generation from the input unit 21 as an image for generation of interest.

In step S3, the feature point extracting unit 24 extracts a feature point from the image for generation of interest to supply this to the feature amount extracting unit 25 along with the image for generation of interest.

In step S4, the feature amount extracting unit 25 similarly extracts feature point feature amount representing the feature of the feature point from the feature point extracting unit 24 from the image for generation of interest from the feature point extracting unit 24, and supplies this to the whole feature amount calculating unit 26 in a manner correlated with the feature point from the feature point extracting unit 24.

Also, the feature amount extracting unit 25 extracts a correct answer label added to the image for generation of interest from the feature point extracting unit 24, and supplies this to the whole feature amount calculating unit 26.

In step S5, the whole feature amount calculating unit 26 calculates, based on the shared code book 81 stored in the shared code book storage unit 23, the whole feature amount representing the feature of the whole of the image for generation of interest thereof from the feature point feature amount from the feature amount extracting unit 25.

Specifically, for example, as described with reference to FIG. 6, the whole feature amount calculating unit 26 calculates the whole feature amount of the image for generation of interest based on the feature point feature amount correlated with each of the discriminators Cbn included in the shared information 65 (e.g., shared information $65_2$ in the event of generating an identifier for identifying whether or not an object to be identified belongs to the category B of automobiles, and dimensional information) included in the shared code book 81.

The whole feature amount calculating unit 26 supplies the whole feature amount of the calculated image for generation of interest to the identifier generating unit 27 along with the correct answer label from the feature amount extracting unit 25.

In step S6, the feature point extracting unit 24 determines whether or not all of the multiple images for generation from the input unit 21 have been taken as an image for generation of interest, and in the event that determination is made that all of the multiple images for generation from the input unit 21 have not been taken as an image for generation of interest, returns the processing to step S2.

Subsequently, in step S2, the feature point extracting unit 24 takes, of the multiple images for generation from the input unit 21, an image for generation that has not been taken as an image for generation of interest as a new image for generation of interest, and the processing proceeds to step S3, and thereafter, the same processing is performed.

Also, in the event that determination is made in step S6 that all of the multiple images for generation from the input unit 21 have been taken as an image for generation of interest, the processing proceeds to step S7.

In step S7, the identifier generating unit 27 performs identifier generation processing for generating an identifier and dimensional information using the whole feature amount of each of the multiple images for generation, and the correct answer label of each of the multiple images for generation, in response to the corresponding whole feature amount and correct answer label being supplied regarding each of the multiple images for generation from the whole feature amount calculating unit 26. This is the end of the first learning processing. Note that the details of the first learning processing will be described later with reference to the flowchart in FIG. 11.

Details of Shared Code Book Generation Processing

Figure 9:
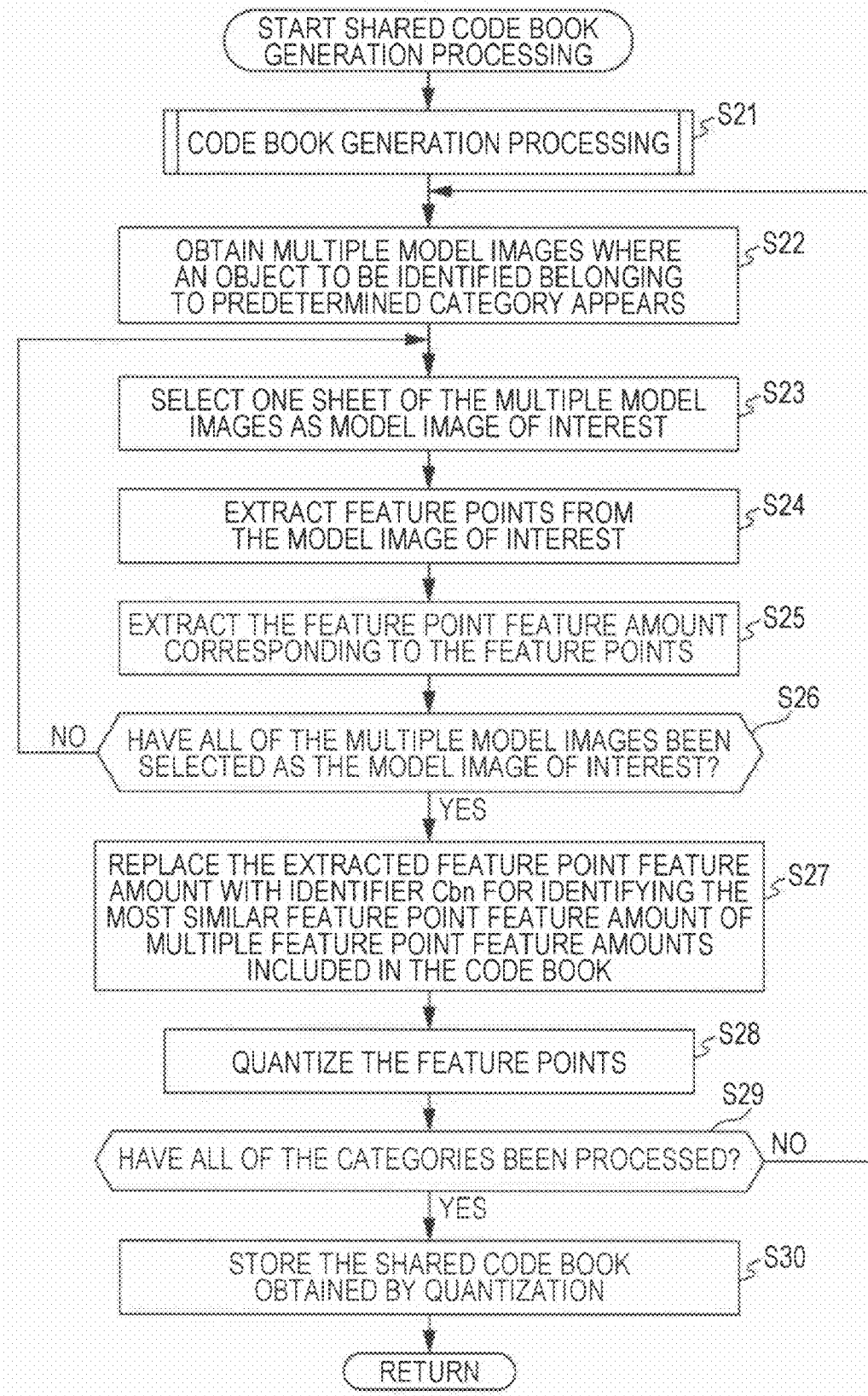
FIG. 9 is a flowchart for describing shard code book generation processing.

Next, the details of the shared code book generation processing in step S1 in FIG. 8 will be described with reference to the flowchart in FIG. 9.

In step S21, the feature point extracting unit 41 through the code book generating unit 43 of the shared code book generating unit 22 perform code book generation processing for generating a code book in which the feature point feature amount extracted from the multiple primitive images from the input unit 21 is correlated with the discriminator Cb for uniquely identifying the feature point feature amount thereof, and supplying and storing this in the code book storage unit 44. Note that the details of the code book generation processing will be described with reference to the flowchart in FIG. 10.

In step S22, the feature point extracting unit 45 obtains, of the multiple model images from the input unit 21, a model image where an object to be identified belonging to a predetermined category (e.g., notebook personal computer) exists.

In step S23, the feature point extracting unit 45 sequentially takes each of the model images obtained in the processing in step S22 as a model image of interest.

In step S24, the feature point extracting unit 45 extracts a feature point from the model image of interest, and supplies this to the feature amount extracting unit 46 along with the model image of interest.

In step S25, the feature amount extracting unit 46 similarly extracts feature point feature amount representing the feature of the feature point from the feature point extracting unit 45 from the model image of interest from the feature point extracting unit 45. Subsequently, the feature amount extracting unit 46 correlates the extracted feature point feature amount with the feature point from the feature point extracting unit 45.

In step S26, the feature point extracting unit 45 determines whether or not all of the model images obtained in the processing in step S22 have been taken as a model image of interest, and in the event that all of the model images obtained in the processing in step S22 have not been taken as a model image of interest yet, returns the processing to step S23.

Subsequently, in step S23, the feature point extracting unit 45 takes a model image that has not been taken as a model image of interest of the model images obtained in the processing in step S22 as a new model image of interest, advances the processing to step S24, and thereafter, the same processing is performed.

Also, in the event that determination is made in step S26 that all of the model images obtained in the processing in step S22 have been taken as a model image of interest, the feature point extracting unit 45 informs the feature amount extracting unit 46 accordingly.

In response to the notice from the feature point extracting unit 45, the feature amount extracting unit 46 generates an initial feature amount pool 62 including the feature point feature amount extracted in the processing in step S25, supplies this to the feature amount replacing unit 47, and advances the processing to step S27.

In step S27, the feature amount replacing unit 47 replaces the feature point feature amount included in the initial feature amount pool 62 from the feature amount extracting unit 46 with the discriminator Cbn included in the code book 61 stored in the code book storage unit 44.

Specifically, for example, the feature amount replacing unit 47 reads out the code book 61 from the code book storage unit 44. Subsequently, the feature amount replacing unit 47 replaces the feature point feature amount fvec' included in the initial feature amount pool 62 from the feature amount extracting unit 46 with the discriminator Cbn for identifying the feature point feature amount fvec most similar to the feature point feature amount fvec' of the plurality of feature point feature amounts included in the read code book 61.

In this way, the feature amount replacing unit 47 replaces each of the plurality of feature point feature amounts included in the initial feature amount pool 62 from the feature amount extracting unit 46 with the discriminator Cbn included in the code book 61 stored in the code book storage unit 44.

Thus, the feature amount replacing unit 47 generates a feature amount pool 63 including the discriminator Cbn correlated with the feature point from the initial feature amount pool 62 including the feature point feature amount fvec' correlated with the feature point. The feature amount replacing unit 47 supplies the generated feature amount pool 63 to the quantizing unit 48.

Also, the feature amount replacing unit 47 supplies the code book 61 read out from the code book storage unit 44 to the quantizing unit 48.

In step S28, the quantizing unit 48 quantizes the feature point correlated with the discriminator Cbn included in the feature amount pool 63 from the feature amount replacing unit 47, and obtains a quantized feature amount pool 64 obtained as a result thereof.

Subsequently, the quantizing unit 48 obtains shared information 65 to be obtained by grouping the same discriminators Cbn of the discriminators Cbn included in the obtained quantized feature amount pool 64.

In step S29, the feature point extracting unit 45 determines whether or not, of the multiple model images from the input unit 21, the model images regarding all of the categories have been obtained in the processing in step S22, and in the event that determination is made that the model images regarding all of the categories have not been obtained, returns the processing to step S22.

Subsequently, in step S22, the feature point extracting unit 45 obtains, of the multiple model images from the input unit 21, the model image of an object to be identified belonging to a category that has not been obtained yet (e.g., automobiles), advances the processing to step S23, and thereafter, the same processing is performed.

Also, in the event that determination is made in step S29 that of the multiple model images from the input unit 21, the model images regarding all of the categories have been obtained, the feature point extracting unit 45 advances the processing to step S30.

In step S30, the quantizing unit 48 supplies and stores, for each category, the shared information 65 (e.g., the shared information 65₁ of the category A, the shared information 65₂ of the category B, etc.) obtained in the processing in step S28, and the code book 61 from the feature amount replacing unit 47 to the shared code book storage unit 23 as a shared code book 81, and returns the processing to step S1 in FIG. 8.

Details of Code Book Generation Processing

Next, description will be made regarding the details of the code book generation processing for generating a code book 61 to be performed by the feature point extracting unit 41 through the code book generating unit 43 of the shared code book generating unit 22 in step S21 in FIG. 9, with reference to the flowchart in FIG. 10.

In step S51, the feature point extracting unit 41 sequentially takes each of the multiple primitive images from the input unit 21 as a primitive image of interest.

In step S52, the feature point extracting unit 41 extracts a feature point from the primitive image of interest, and supplies this to the feature amount extracting unit 42 along with the primitive image of interest.

In step S53, the feature amount extracting unit 42 similarly extracts feature point feature amount representing the feature of the feature point from the feature point extracting unit 41 from the primitive image from the feature point extracting unit 41, and supplies this to the code book generating unit 43.

In step S54, the feature point extracting unit 41 determines whether or not all of the multiple primitive images from the input unit 21 have been taken as a primitive image of interest, and in the event that determination is made that all of the multiple primitive images from the input unit 21 have not been taken as a primitive image of interest yet, returns the processing to step S51.

Subsequently, in step S51, the feature point extracting unit 41 takes, of the multiple primitive images from the input unit 21, a primitive image that has not been taken as a primitive image of interest yet, as a new primitive image of interest, advances the processing to step S52, and thereafter, the same processing is performed.

Also, in the event that determination is made in step S54 that all of the multiple primitive images from the input unit 21 have been taken as a primitive image of interest, the feature point extracting unit 41 advances the processing to step S55.

In step S55, the code book generating unit 43 generates a code book made up of feature point feature amount representing each group obtained by grouping the plurality of feature point feature amounts, based on the plurality of feature point feature amounts supplied from the feature amount extracting unit 42.

Specifically, for example, the code book generating unit 43 groups the plurality of feature point feature amounts to be supplied from the feature amount extracting unit 42 into several groups by a clustering method such as the k-means method in the feature amount space. Subsequently, the code book generating unit 43 determines, for every several groups obtained by grouping, the centroid of feature point feature amount belonging to the groups thereof as feature point feature amount representing the groups.

Also, the code book generating unit 43 correlates the feature point feature amount determined for every several groups with the discriminator Cbn for uniquely identifying the feature point feature amount thereof. Also, the code book generating unit 43 generates a code book 61 including the feature point feature amount correlated with the discriminator Cbn, supplies and stores this to the code book storage unit 44, and return the processing to step S21 in FIG. 9.

Details of Identifier Generation Processing

Next, description will be made regarding the details of the identifier generation processing for generating an identifier and dimensional information to be performed by the identifier generating unit 27 in step S7 of FIG. 8, with reference to the flowchart in FIG. 11.

In step S71, the identifier generating unit 27 sets the initial values $D_1(1), D_1(2), \ldots, D_1(N)$ of the weight $D_t(i)$ to cause an error of the identification result of the image for registration to affect the error value $\epsilon_{t,d}$ representing a degree of the weak learners $h_{t,d}(x_{i,d})$ mistaking identification, for example, in accordance with the following Expression (2), and advances the processing to step S72.

$$D_t(i) = \frac{1}{N} \quad (2)$$

In step S72, the identifier generating unit 27 initializes a variable t for counting the number of the weak learners $h_{t,d}(x_{i,d})$ making up the identifier H(x) to 1, and advances the processing to step S73.

In step S73, the identifier generating unit 27 determines (the threshold $TH_{t,d}$) of the weak learners $h_{t,d}(x_{i,d})$ so that the error value $\epsilon_{t,d}$ to be obtained by using the weight $D_t(i)$ becomes the minimum, regarding each of the dimensions $d=1, 2, \ldots, M$ of the whole feature amount $x_i$, and advances the processing to step S74.

Here, in step S73, the identifier generating unit 27 determines the threshold $TH_{t,d}$ of the weak learners $h_{t,d}(x_{i,d})$ so that the error value $\epsilon_{t,d}$ to be calculated in accordance with the following Expression (3) becomes the minimum for example.

$$\varepsilon_{t,d} = \sum_{i=1}^{N} D_t(i)[y_i \neq h_{t,d}(x_{i,d})] \quad (3)$$

In Expression (3), $[y_i \neq h_{t,d}(x_{i,d})]$ is an indicator function, 1 is obtained when the expression $y_i \neq h_{t,d}(x_{i,d})$ holds, and 0 is obtained when the expression $y_i \neq h_{t,d}(x_{i,d})$ does not hold.

Therefore, according to Expression (3), the error value $\epsilon_{t,d}$ is obtained by adding only the weight $D_t(i)$ of the image for generation where the identification result by the weak learners $h_{t,d}(x_{i,d})$ mistakes (image for generation where the expression $y_i \neq h_{t,d}(x_{i,d})$ holds) of the N images for generation.

In step S74, the identifier generating unit 27 uses the weak learners $h_{t,d}(x_{i,d})$ determined regarding each of the dimensions d=1, 2, ..., M in the last processing in step S73 to obtain the minimum value $\epsilon_t$ out of the error values $\epsilon_{t,1}, \epsilon_{t,2}, \ldots, \epsilon_{t,M}$ to be calculated in accordance with Expression (3). Further, the identifier generating unit 27 obtains the dimension (minimum error dimension) d(t) (an integer value in a range of 1 through M) whereby the minimum value $\epsilon_t$ of the error values $\epsilon_{t,1}$ through $\epsilon_{t,M}$ can be obtained, and advances the processing to step S75.

Here, the minimum error dimension d(t) is the dimension of dimensional feature amount to be used for identification by the identifier H(x) of the dimensional feature amount making up the whole feature amount. Accordingly, with identification by the identifier H(x), the dimensional feature amount of the minimum error dimension d(t) is selected out of the dimensional feature amount making up the whole feature amount, and is used for identification.

Also, if we say that the minimum value $\epsilon_t$ of the error values $\epsilon_{t,1}, \epsilon_{t,2}, \ldots, \epsilon_{t,M}$ is the minimum error value $\epsilon_t$, the weak learners $h_{t,d}(t)(x_{i,d}(t))$ whereby the minimum error value $\epsilon_t$ thereof can be obtained becomes the t'th weak learner making up the identifier H(x).

In step S75, the identifier generating unit 27 uses the minimum error value $\epsilon_t$ obtained in the last processing in step S74 to obtain reliability a representing the reliability of identification of the image for generation by the t'th weak learner $h_{t,d}(t)(x_{i,d}(t))$ making up the identifier H(x) in accordance with the following Expression (4), and advances the processing to step S76.

$$\alpha_t = \frac{1}{2}\ln\left(\frac{1-\varepsilon_t}{\varepsilon_t}\right) \quad (4)$$

Here, in Expression (4), ln represents a natural logarithm, and according to Expression (4), the greater (or smaller) the minimum error value $\epsilon_t$ is, the smaller (or greater) the value of the reliability $\alpha_t$ is obtained.

In step S76, the identifier generating unit 27 updates the weight $D_t(i)$ to weight $D_{t+1}(i)$ in accordance with the following Expression (5), and advances the processing to step S77.

$$D_{t+1}(i) = \frac{D_t(i)}{Z_t} \times \begin{cases} e^{-\alpha_t} & \text{if } h_{t,d(t)}(x_{i,d(t)}) = y_i \\ e^{\alpha_t} & \text{if } h_{t,d(t)}(x_{i,d(t)}) \neq y_i \end{cases} \quad (5)$$

$$= \frac{D_t(i)}{Z_t} \times e^{-\alpha_t y_t h_{t,d(t)}(x_{1,d(t)})}$$

Here, in Expression (5), a coefficient $Z_t$ is a coefficient for normalization of the weight $D_{t+1}(i)$, and is represented with the following Expression (6).

$$Z_t = \sum_{i=1}^{N} D_t(i) e^{-\alpha_t y_t h_{t,d(t)}(x_{t,d(t)})} \quad (6)$$

According to Expression (6), with regard to the i'th image for generation where the identification result by the weak learner $h_{t,d}(t)(x_{i,d}(t))$ is correct, i.e., the image for generation where the identification result is matched with the correct answer label $y_i$, the weight $D_t(i)$ is updated to weight $D_{t+1}(i)$ having a smaller value. As a result thereof, in the next step S73, the error value $\epsilon_{t,d}$ to be calculated by using the weight $D_t(i)$ becomes a smaller value.

On the other hand, with regard to the i'th image for generation where the identification result by the weak learner $h_{t,d}(t)(x_{i,d}(t))$ is incorrect, i.e., the image for generation where the identification result is not matched with the correct answer label $y_i$, the weight $D_t(i)$ is updated to weight $D_{t+1}(i)$ having a greater value. As a result thereof, in the next step S73, the error value $\epsilon_{t,d}$ to be calculated by using the weight $D_t(i)$ becomes a greater value.

In step S77, the identifier generating unit 27 determines whether or not the variable t is equal to the number T of the weak learners $h_{t,d}(x_{i,d})$ making up the identifier H(x).

In the event that determination is made in step S77 that the variable t is unequal to the number T of the weak learners, the identifier generating unit 27 advances the processing to step S78, increments the variable t by one, returns the processing to step S73 from step S78, and thereafter, the same processing is performed.

Also, in the event that determination is made in step S77 that the variable t is equal to the number T of the weak learners, i.e., in the event that the T weak learners $h_{1,d}(1)(x_{i,d}(1))$, $h_{2,d}(2)(x_{i,d}(2))$, ..., $h_{T,d}(T)(x_{i,d}(T))$ making up the identifier H(x) and the T minimum error dimensions d(1), d(2), ..., d(T) have been generated, the identifier generating unit 27 advances the processing to step S79.

In step S79, the identifier generating unit 27 outputs the T weak learners $h_{1,d}(1)(x_{i,d}(1))$, $h_{2,d}(2)(x_{i,d}(2))$, ..., $h_{T,d}(T)(x_{i,d}(T))$, and the T pieces of reliability $\alpha_1, \alpha_2, \ldots, \alpha_T$ as (the parameters stipulating) the identifier H(x).

Further, in step S79, the identifier generating unit 27 outputs the T minimum error dimensions d(1), d(2), ..., d(T) as dimensional information, ends the identifier generation processing, and returns the processing to step S7 in FIG. 8.

With the identifier generating unit 27, as described above, according to the statistic learning by boosting (first learning processing), there are obtained, of the dimensional feature amount making up the whole feature amount, the dimensions (minimum error dimensions) d(1) through d(T) representing the T dimensional feature amount effective for identifying an object to be identified, and the identifier H(x) for performing identification using the dimensional feature amount of the minimum error dimension d(t).

In this way, with the first learning processing to be performed by the learning device 1, in the event of generating the minimum error dimensions d(1) through d(T) serving as dimensional information, and the identifier H(x), the shared code book 81 is employed, which shares the feature point feature amount included in the code book 61 (e.g., the feature point feature amount fvec to be identified by the discriminator $Cb_{30}$) between different categories to be identified (e.g., categories A and B).

Therefore, with the first learning processing, as compared to a case where an identifier and so forth are generated by using a code book generated for every category, multiple identifiers for identifying each of different objects to be identified can be generated without increasing the feature point feature amount included in the code book 61 included in the shared code book 81.

Also, with the first learning processing, the shared information 65 included in the shared code book 61 holds a feature point extracted from a model image for every category. Specifically, for example, the shared information $65_1$ holds a feature point extracted from a model image where a notebook personal computer belonging to the category A exists, and the shared information $65_2$ holds a feature point extracted from a model image where an automobile belonging to the category B exists, respectively.

Here, a feature point extracted from a model image where a notebook personal computer belonging to the category A exists generally differs from a feature point extracted from a model image where an automobile belonging to the category B exists.

Accordingly, the shared information 65 included in the shared code book 61 holds a different feature point for every category.

Therefore, in the event that in step S5 of the first learning processing, the whole feature amount calculating unit 26 calculates the whole feature amount, a position where the search region of the image for generation exists, which is determined based on the feature point held in the shared information 65, differs for every category to be identified.

Therefore, with the whole feature amount calculating unit 26, for example, as compared to a case where the whole region on the image for generation is divided into grid-shaped search ranges, and a search range common between categories (search range existing one the same position) is employed, the whole feature amount to be used for generation of an identifier can be calculated in a more accurate manner.

Accordingly, in step S7 of the first learning processing, the identifier generating unit 27 can generate an identifier (and dimensional information) with higher precision based on the calculated whole feature amount.

Configuration Example of Identifying Device 181

FIG. 12 illustrates a configuration example of an identifying device 181 for performing identification using the identifier H(x) and the dimensional information d(1), d(2), . . . , d(T) obtained by the learning device 1.

This identifying device 181 uses the identifier H(x) obtained by the learning device 1, and the minimum error dimensions d(1) through d(T) serving as dimensional information to identify whether or not a subject existing on an image to be processed is a predetermined object to be identified, and specifically, whether or not a subject existing on an image to be processed belongs to a predetermined category.

Specifically, this identifying device 181 is configured of a shared code book storage unit 201, a dimensional information storage unit 202, an identifier storage unit 203, a feature point extracting unit 204, a feature amount extracting unit 205, a whole feature amount calculating unit 206, and an identifying unit 207.

The shared code book storage unit 201 stores the same shared code book 81 as that stored in the shared code book storage unit 23 (FIG. 1) of the learning device 1 beforehand.

The dimensional information storage unit 202 stores the minimum error dimensions d(1) through d(T) beforehand serving as the dimensional information obtained regarding a predetermined object to be identified at the identifier generating unit 27 of the learning device 1.

The identifier storage unit 203 stores the T weak learners $h_{1,d}(1)(x_{i,d}(1)), h_{2,d}(2)(x_{i,d}(2)), \ldots, h_{T,d}(T)(x_{i,d}(T))$ serving as the identifier H(x) obtained regarding a predetermined object to be identified at the identifier generating unit 27 of the learning device 1, and the T pieces of reliability $\alpha_1, \alpha_2, \ldots, \alpha_T$ beforehand.

An image to be processed that is an object to be identified regarding whether or not a subject existing on the image is an object to be identified is supplied to the feature point extracting unit 204. The feature point extracting unit 204 extracts a feature point from the supplied image to be processed in the same way as with the feature point extracting unit 24 of the learning device 1, and supplies this to the feature amount extracting unit 205 along with the image to be processed.

The feature amount extracting unit 205 similarly extracts the feature point feature amount of the feature point from the feature point extracting unit 204 from the image to be processed from the feature point extracting unit 204 in the same way as with the feature amount extracting unit 25 of the learning device 1.

Subsequently, the feature amount extracting unit 205 supplies the extracted feature point feature amount to the whole feature amount calculating unit 206 in a manner correlated with the feature point from the feature point extracting unit 204.

The whole feature amount calculating unit 206 obtains, in the same way as with the whole feature amount calculating unit 26 of the learning device 1, from the feature point feature amount of the image to be processed from the feature amount extracting unit 205, dimensional feature amount making up the whole feature amount of the image to be processed thereof, based on the feature point feature amount corresponding to each of the discriminators Cbn included in the shared information 65 (e.g., the shared information $65_2$ of the category B in the event of identifying whether or not an object to be identified belongs to the category B of automobiles) included in the shared code book 81 stored in the shared code book storage unit 201.

However, with the whole feature amount calculating unit 206, not all of the M pieces of the dimensional feature amount making up the whole feature amount of the image to be processed but the dimensional feature amount of the minimum error dimensions d(1) through d(T) serving as the dimensional information stored in the dimensional storage unit 202 of the M pieces of the dimensional feature amount thereof is selectively obtained.

Note that, with the whole feature amount calculating unit 206, from the start, of the whole feature amount of the image to be processed, only the dimensional feature amount of the minimum error dimensions d(1) through d(T) serving as the dimensional information may be obtained, or after the whole feature amount of the image to be processed is obtained, the dimensional feature amount of the minimum error dimensions d(1) through d(T) may be obtained out of the whole feature amount thereof.

Now, for example, let us say that a vector with M pieces of dimensional feature amount as elements, which is configured of M pieces of dimensional feature amount, and serves as the whole feature amount of the image to be processed, is represented as x'. Also, the m'th of the M pieces of the dimensional feature amount of the whole feature amount x' of the image to be processed is represented as $x_m'$.

In this case, of the M pieces of the dimensional feature amount of the whole feature amount x' of the image to be processed, the dimensional feature amount of the minimum error dimensions d(1) through d(T) is represented as $x_{d(1)}', x_{d(2)}', \ldots, x_{d(T)}'$.

The whole feature amount calculating unit 206 selects (selectively obtains), of the M pieces of the dimensional feature amount of the whole feature amount x' of the image to be processed, the T pieces of the dimensional feature amount $x_{d(1)}'$ through $x_{d(T)}'$ of the minimum error dimensions d(1) through d(T), and supplies these to the identifying unit 207.

The identifying unit 207 identifies whether or not a subject existing on the image to be processed is a predetermined object to be identified, by providing the dimensional feature amount $x_{d(1)}'$ through $x_{d(T)}'$ of the minimum error dimensions d(1) through d(T) of the image to be processed to the identifier H(x') stored in the identifier storage unit 203 as input x', and outputs the identification result thereof.

Specifically, the identifying unit 207 uses the T weak learners $h_{1,d}(1)(x_{d(1)}'), h_{2,d}(2)(x_{d(2)}'), \ldots, h_{T,d}(T)(x_{d(T)}')$, and the T pieces of reliability $\alpha_1, \alpha_2, \ldots, \alpha_T$ as the identifier H(x') stored in the identifier storage unit 203 to calculate the function H(x') of the following Expression (7) serving as the identifier H(x').

$$H(x') = \text{sign}\left(\sum_{t=1}^{T} \alpha_t h_{t,d(t)}(x'_{d(t)})\right) \qquad (7)$$

Here, in Expression (7), sign( ) is a function to output, for example, +1 when a sign within parentheses is positive, and −1 when the sign is negative, respectively. Accordingly, the value of the function H(x') in Expression (7) becomes +1 or −1.

In the event that the value of the function H(x') in Expression (7) is +1, this represents an identification result to the effect that a subject exiting on the image to be processed is a predetermined object to be identified, and in the event that the value of the function H(x') in Expression (7) is −1, this represents an identification result to the effect that a subject exiting on the image to be processed is not a predetermined object to be identified.

Operational Description of Identifying Device 181

Next, description will be made regarding identification processing (hereafter, referred to as "first identification processing") to be performed by the identifying device 181 with reference to the flowchart in FIG. 13.

This first identification processing is started, for example, in the event that the image to be processed has been supplied to the feature point extracting unit 204 of the identifying device 181.

In step S91, the feature point extracting unit 204 extracts a feature point from the supplied image to be processed, supplies this to the feature amount extracting unit 205 along with the image to be processed, and advances the processing to step S92.

In step S92, the feature amount extracting unit 205 similarly extracts the feature point feature amount of the feature point from the feature point extracting unit 204 from the image to be processed, supplied from the feature point extracting unit 204, supplies this to the whole feature amount calculating unit 206, and advances the processing to step S93.

In step S93, the whole feature amount calculating unit 206 obtains from the feature point feature amount of the image to be processed, supplied from the feature amount extracting unit 205, of the dimensional feature amount making up the whole feature amount of the image to be processed thereof, the dimensional feature amount $x_{d(1)}'$ through $x_{d(T)}'$ of the minimum error dimensions d(1) through d(T) serving as the dimensional information stored in the dimensional information storage unit 202, based on the shared code book 81 stored in the shared code book storage unit 201.

Specifically, for example, the whole feature amount calculating unit 206 obtains the dimensional feature amount $x_{d(1)}'$ through $x_{d(T)}'$ of the minimum error dimensions d(1) through d(T) based on the feature point feature amount correlated with each of the discriminators Cbn included in the shared information 65 (e.g., shared information $65_2$ in the event of identifying whether an object to be identified belongs to the category B of mobiles) included in the shared code book 81.

Subsequently, the whole feature amount calculating unit 206 supplies the dimensional feature amount $x_{d(1)}'$ through $x_{d(T)}'$ of the minimum error dimensions d(1) through d(T) to the identifying unit 207, and advances the processing to step S94.

In step S94, the identifying unit 207 identifies whether or not a subject existing on the image to be processed is a predetermined object to be identified, by providing the dimensional feature amount $x_{d(1)}'$ through $x_{d(T)}'$ of the minimum error dimensions d(1) through d(T) of the image to be processed to the identifier H(x') stored in the identifier storage unit 203 and represented with Expression (7) as input x', outputs the identification result thereof, and the first identification processing is ended.

As described above, with the first identification processing to be performed by the identifying device 181, in the event that the whole feature amount calculating unit 206 obtains the dimensional feature amount $x_{d(1)}'$ through $x_{d(T)}'$ in step S93, the shared code book 81 is employed wherein the feature point feature amount (e.g., feature point feature amount fvec to be identified by the discriminator $Cb_{30}$) included in the code book 61 is shared between different categories to be identified (e.g., categories A and B).

Accordingly, for example, with the identifying device 181, even in the event that there are multiple categories to be identified, unlike a case where a different code book is generated for every multiple categories, increase in feature point feature amount included in the code book 61 included in the shared code book 81 can be prevented.

Also, in step S93 of the first identification processing, the whole feature amount calculating unit 206 calculates, in the same way as with the whole feature amount calculating unit 26 in step S5 of the first learning processing, the dimensional feature amount $x_{d(1)}'$ through $x_{d(T)}'$ of the minimum error dimensions d(1) through d(T) of the dimensional feature amount making up the whole feature amount of the image to be processed.

Therefore, with the whole feature amount calculating unit 206, in the same way as with the whole feature amount calculating unit 26, for example, as compared to a case where the whole region on the image to be processed is divided into grid-shaped search ranges, and a common search range (search range existing in the same position) is used between categories, the dimensional feature amount $x_{d(1)}'$ through $x_{d(T)}'$ of the minimum error dimensions d(1) through d(T) of the dimensional feature amount making up the whole feature amount of the image to be processed, can be calculated in a more accurate manner.

Accordingly, in step S94 of the first identification processing, with the identifying unit 207, as compared to a case where a common search range is used between categories to be identified, based on the dimensional feature amount $x_{d(1)}'$ through $x_{d(T)}'$ calculated by the whole feature amount calculating unit 206, an object to be identified can be identified in a more accurate manner.

With the first embodiment, at the whole feature amount calculating unit 26 of the learning device 1, in the event of calculating a correlation value as an element (dimensional feature amount) of the whole feature amount, the whole feature amount of the image for generation is calculated in the same size of a search range as to any object to be identified regardless of the type of the object to be identified, but it is desirable for the size of the search range to be set to different sizes according to the objects to be identified.

Specifically, for example, it can be conceived that in the event of an object to be identified of which the shape has already been determined, such as an automobile, a relatively small search range is employed, and in the event of an object to be identified of which the shape has not been determined, such as an animal, a relatively great search range is employed.

Also, in the event that the object to be identified is a roof existing in a relatively high place, it can be conceived that the search range is set to be great in the upward direction with a feature point as a reference.

In this way, if a suitable search range is determined for each object to be identified, the whole feature amount of the image for generation can be calculated in a more accurate manner, whereby the precision of identification of an identifier to be generated based on the whole feature amount can be improved.

Second Embodiment

Configuration Example of Learning Device 221

Next, FIG. 14 describes regarding a learning device 221 for determining a search range for each feature point included in the shared information 65 included in the shared code book 81 to calculate the whole feature amount. FIG. 14 illustrates a configuration example of the learning device 221 to which the second embodiment of the present invention has been applied.

Note that, with this learning device 221, portions configured in the same way as those of the learning device 1 in FIG. 1 according to the first embodiment are denoted with the same reference numerals, so description thereof will be omitted hereafter.

Specifically, with the learning device 221, a range determining unit 241 is newly provided, and also a shared code book storage unit 242 and a whole feature amount calculating unit 243 are provided instead of the shared code book storage unit 23 and whole feature amount calculating unit 26, but the others are configured in the same way as those in the learning device 1.

The image for generation is provided from the input unit 21 to the range determining unit 241. The range determining unit 241 reads out the shared code book 81 stored in the shared code book storage unit 242.

Subsequently, the range determining unit 241 performs range determination processing for determining a search range representing a range on the image for generation to be searched for obtaining a correlation value as to the image for generation from the input unit 21 for each feature point included in the shared information 65 included in the shared code book 81. Note that the details of the range determination processing to be performed by the range determining unit 241 will be described later with reference to FIG. 15.

The range determining unit 241 generates a shared code book 81' in which the determined search range is correlated with a feature point included in the shared information 65 included in the shared code book 81 based on the shared code book 81, and supplies and stores this in the shared code book storage unit 242.

The shared code storage unit 242 stores the shared code book 81 from the shared code book generating unit 22. Also, the shared code book storage unit 242 stores the shared code book 81' generated and supplied from the range determining unit 241.

Note that an arrangement may be made wherein the shared code book generating unit 22 supplies the generated shared code book 81 not to the shared code book storage unit 242 but to the range determining unit 241, and the range determining unit 241 generates a shared code book 81' based on the shared code book 81 from the shared code book generating unit 22, and supplies and stores this in the shared code book storage unit 242.

In this case, the shared code book storage unit 242 stores only the shared code book 81' from the range determining unit 241.

The correct answer label of the image for generation of interest, and the feature point feature amount extracted from the image for generation of interest are supplied to the whole feature amount calculating unit 243 in the same way as with the whole feature amount calculating unit 26.

The whole feature amount calculating unit 243 calculates whole feature amount representing the feature of the whole of the image for generation of interest thereof from the feature point feature amount from the feature amount extracting unit 25 based on the shared code book 81' stored in the shared code book storage unit 242. Note that with regard to the processing to be performed by the whole feature amount calculating unit 243 will be described later with reference to FIG. 16.

Subsequently, the whole feature amount calculating unit 243 supplies the calculated whole feature amount of the image for generation of interest to the identifier generating unit 27 along with the correct answer label of the image for generation of interest from the feature amount extracting unit 25.

Range Determination Processing to be Performed by Range Determining Unit 241

FIG. 15 illustrates an example of the range determination processing to be performed by the range determining unit 241.

The left side in FIG. 15 illustrates the shared information 65 included in the shared code book 81, and the images for generation $261_1$ through $261_5$. Note that of the images for generation $261_1$ through $261_5$, the images for generation $261_1$ through $261_3$ represent positive images, and the images for generation $261_4$ and $261_5$ represent negative images.

The middle in FIG. 15 illustrates correlation values $x_i$ (Corr_1 through Corr_5) serving as predetermined dimensional feature amount to be calculated from each of the images for generation $261_1$ through $261_5$, and the correct answer label $y_i$ ($y_i$ is a value of either +1 or −1) of each of the images for generation $261_1$ through $261_5$.

The right side in FIG. 15 illustrates an error map 281 holding an error rate Error (illustrated with a rectangle) representing a degree of mistaking identification regarding whether each of the images for generation $261_1$ through $261_5$ is a positive image or negative image for each candidate range that is a candidate of the search range.

Note that, with the error map 281, a horizontal axis Search x represents the length in the horizontal direction (x direction) of the candidate range, and a vertical axis Search y represents the length in the vertical direction (y direction) of the candidate range.

Accordingly, with the error map 281, of the multiple rectangles, for example, the rectangle 301 illustrates an error rate Error in the candidate range of 10×10 pixels (width×height).

Here, the error rate Error is matched with the above error value in that the error rate Error is error information representing a degree of mistaking identification of an image for generation (positive image or negative image).

However, the error value is used for generating an identifier and dimensional information, and differs from the error rate Error in that the error rate Error is used for determining a search range out of the multiple candidate ranges, so with the present Specification, the error rate Error and the error value are distinctively described.

The range determining unit 241 reads out the shared code book 81 stored in the shared code book storage unit 242 from the shared code book storage unit 242.

The range determining unit 241 sequentially takes multiple feature points included in each piece of the shared information 65 included in the read shared code book 81 (e.g., shared information $65_1$ and $65_2$) as a feature point of interest.

Subsequently, the range determining unit 241 calculates an error rate Error for every multiple candidate ranges that are candidates of the search range of the feature point of interest.

Specifically, for example, the search determining unit 241 calculates, with regard to an image for generation $261_1$, a correlation value $x_i$ (=Corr_1) with the feature point feature amount corresponding to the feature point of interest in a candidate range $261S_1$ of 10×10 pixels (width×height) with a position $261C_1$ on an image for generation $261_1$ corresponding to the feature point of interest.

The range determining unit 241 calculates, in the same way as with the case of the image for generation $261_1$, correlation values $x_i$ (=Corr_2 through Corr_5) with the feature point feature amount corresponding to the feature point of interest regarding each of the images for generation $261_2$ through $261_5$.

Subsequently, the range determining unit 241 calculates an error rate in the search range of 10×10 pixels using the following Expression (8) based on the correlation values $x_i$ (=Corr_1 through Corr_5) calculated regarding each of the images for generation $261_1$ through $261_5$, and the correct answer label $y_i$ of each of the images for generation $261_1$ through $261_5$.

$$\text{Error} = Ew/1((y_i \neq f(x_i))] \tag{8}$$

Note that in Expression (8), $f(x_i)$ is a function for identifying whether each of the images for generation $261_1$ through $261_5$ is a positive image or negative image based on the correlation value $x_i$.

The function $f(x_i)$ outputs a value 1 representing that the corresponding image for generation has been identified as a positive image in the event that the correlation value $x_i$ is equal to or greater than a threshold Thresh, and outputs a value −1 representing that the corresponding image for generation has been identified as a negative image in the event that the correlation value $x_i$ is less than a threshold Thresh.

Note that the threshold Thresh is taken as a value between the minimum value and the maximum value of the correlation values $x_i$, and is taken as a value whereby difference between the correct answer label $y_i$, and the value of the corresponding function $f(x_i)$ becomes the minimum, i.e., a value whereby the error rate Error becomes the minimum.

Specifically, for example, each of the calculated correlation values $x_i$ (=Corr_1 through Corr_5) is taken as a candidate threshold serving as a candidate of the threshold Thresh, and the error rate Error by Expression (8) is calculated. Subsequently, of the multiple candidate thresholds, a candidate threshold whereby difference between the correct answer label $y_i$ and the value of the function $f(x_i)$ becomes the minimum is taken as the threshold Thresh.

Also, in Expression (8), with the function $Ew[1((y_i \neq f(x_i)))]$, the output value is 1 when the correct answer label $y_i$ and the output value of the function $f(x_i)$ are not matched, and is 2 when the correct answer label $y_i$ and the output value of the function $f(x_i)$ are matched.

The range determining unit 241 stores the error rate Error in the candidate range of 10×10 pixels calculated using Expression (8) in the corresponding error map 281. Thus, the error map holds the error rate Error in the candidate range of 10×10 pixels (illustrated with the rectangle 301).

The range determining unit 241 calculates, in the same way as with the case of the error rate Error in the candidate range of 10×10 pixels having been calculated, an error rate Error in another candidate range such as a candidate range of 10×20 pixels, or 20×30 pixels, and holds this in the corresponding error holding region of the error map 281.

In this way, the range determining unit 241 generates an error map 281 for holding the error rate Error for every different candidate range such as illustrated on the left side in FIG. 15.

Subsequently, the range determining unit 241 determines, of the multiple error rates Error included in the generated error map 281, the candidate range corresponding to the minimum error rate Error as a search range in the feature point of interest.

The range determining unit 241 correlates (information representing) the determined search range with the feature point of interest. In this way, the range determining unit 241 generates a shared code book 81' including the shared information 65 including the feature point correlated with the search range, and supplies and stores this in the shared code book storage unit 242.

With the whole feature amount calculating unit 243, the whole feature amount of the image for generation is calculated using the shared code book 81' stored in the shared code book storage unit 242.

Example of Correlation Value Calculation to be Performed by Whole Feature Amount Calculating Unit 243

Next, FIG. 16 is a diagram for describing an example of processing to be performed by the whole feature amount calculating unit 243.

Note that, with the whole feature amount calculating unit 243, portions configured in the same way as those in FIG. 6 are denoted with the same reference numerals, so description thereof will be omitted below as appropriate.

Specifically, the whole feature amount calculating unit 243 is configured in the same way as with the case of FIG. 6 except that the shared code book 81' is illustrated instead of the shared code book 81.

The whole feature amount calculating unit 243 calculates the correlation values of the images for generation 141 through 145 in the determined search range for each of the feature point amount $121_1$ through $121_{10}$ corresponding to each of the discriminators Cbn included in the shared information $65_2$ included in the shared code book 81'.

Specifically, for example, the whole feature amount calculating unit 243 reads out the search range correlated with the feature point corresponding to the feature point feature amount $121_n$ (n is a natural number from 1 to 10) of the whole region (whole range) making up the image for generation 141, from the shared information $65_2$ included in the shared code book 81'.

Subsequently, the whole feature amount calculating unit 243 calculates a correlation value between the feature point feature amount $121_n$, and the feature point amount of each feature point existing on the search range of the read image for generation 141, and takes the maximum correlation value of the multiple correlation values obtained by calculation thereof as the final correlation value $161_n$ between the feature point feature amount of interest $121_n$ and the image for generation 141.

The whole feature amount calculating unit 243 calculates correlation values $161_1$ through $161_{10}$ as to the feature point feature amount $121_1$ through $121_{10}$ regarding the image for generation 141, and takes a vector with the calculated correlation values $161_1$ through $161_{10}$ as elements as the whole feature amount of the image for generation 141.

The whole feature amount calculating unit 243 calculates the whole feature amount of each of the images for generation 142 through 145 in the same way as with the case of the whole feature amount of the image for generation 141 having been calculated.

The whole feature amount 243 supplies the whole feature amount of each of the multiple images for generation 141 through 145 to the identifier generating unit 27.

Operational Description of Learning Device 221

Next, learning operation to be performed by the learning device 221 (hereafter, referred to as second learning processing) will be described with reference to the flowchart in FIG. 17.

This second learning processing is stared in the event that an image for learning has been supplied to the input unit 21. At this time, the input unit 21 supplies, of an image for generation, a primitive image, and a model image, serving as images for learning to be supplied, the primitive image and model image to the shared code book generating unit 22, and supplies the image for generation to the feature point extracting unit 24 and range determining unit 241.

In step S111, the same processing as step S1 in FIG. 8 is performed.

In step S112, the range determining unit 241 reads out the shared code book 81 stored in the shared code book storage unit 242.

Subsequently, the range determining unit 241 performs range determination processing for determining a search range representing a range on the image for generation to be searched for obtaining a correlation value as to the image for generation from the input unit 21 for each feature point included in the shared information 65 included in the shared code book 81. Note that the details of the range determination processing to be performed by the range determining unit 241 will be described later with reference to the flowchart in FIG. 18.

In steps S113 through S115, the same processing in steps S2 through S4 in FIG. 8 is performed.

In step S116, the whole feature amount calculating unit 243 calculates, from the feature point feature amount from the feature amount extracting unit 25, whole feature amount representing the feature of the whole of the image for generation of interest thereof based on the shared code book 81' stored in the shared code book storage unit 242.

Specifically, for example, as described in FIG. 16, the whole feature amount calculating unit 243 calculates the whole feature amount of the image for generation of interest based on the search range correlated with each feature point included in the shared information 65 (e.g., shared information $65_2$ in the event of generating an identifier for identifying whether or not an object to be identified belongs to the category B of automobiles, and dimensional information) included in the shared code book 81', and the feature point feature amount correlated with each of the discriminators Cbn included in the shared information 65.

Subsequently, the whole feature amount calculating unit 243 supplies the calculated whole feature amount of the image for generation of interest to the identifier generating unit 27 along with the correct answer label of the image for generation of interest from the feature amount extracting unit 25.

In step S117, the feature point extracting unit 24 determines whether or not all of the images for generation from the input unit 21 have been taken as an image for generation of interest. Subsequently, in the event that determination is made that all of the images for generation from the input unit 21 have not been taken as an image for generation of interest yet, the feature point extracting unit 24 returns the processing to step S113.

In step S113, the feature point extracting unit 24 takes, of the multiple images for generation from the input unit 21, an image for generation that has not been taken as an image for generation of interest yet as a new image for generation of interest, and advances the processing to step S114, and thereafter, the same processing is performed.

Also, in the event that determination is made in step S117 that all of the multiple images for generation from the input unit 21 have been take as an image for generation of interest, the feature point extracting unit 24 advances the processing to step S118.

In step S118, the same processing as step S7 is performed. So far the second learning processing is ended.

Operational Description of Range Determining Unit 241

Next, the range determination processing to be performed by the range determining unit 241 in step S112 in FIG. 17 will be described with reference to the flowchart in FIG. 18.

In step S131, the range determining unit 241 reads out the shared code book 81 stored in the shared code book storage unit 242 from the shared code book storage unit 242.

Subsequently, the range determining unit 241 sequentially takes the multiple feature points included in each piece of the shared information 65 (e.g., shared information $65_1$ or shared information $65_2$) included in the read shared code book 81 as a feature point of interest.

In step S132, the range determining unit 241 specifies one of the multiple candidate ranges that are candidates of the search range in the feature point of interest based on the multiple images for generation (e.g., images for generation $261_1$ through $261_5$) from the input unit 21.

Specifically, for example, the range determining unit 241 specifies a candidate range of 10×10 pixels (width×height) as the candidate range corresponding to the feature point of interest regarding multiple images for generation.

In step S133, the range determining unit 241 calculates a correlation value $x_i$ between the feature point feature amount of a feature point existing on the specified candidate range of each of the multiple images for generation, and the feature point corresponding to the feature point of interest.

In step S134, the range determining unit 241 calculates an error rate in the search range specified in the last processing in step S132 using Expression (8) based on the calculated correlation values $x_i$ regarding the multiple images for generation, and the correct answer labels $y_i$ of the multiple images for generation.

Subsequently, the range determining unit 241 holds the error rate Error in the candidate range of 10×10 pixels calculated using Expression (8) in the corresponding error holding region of the error map 281 (e.g., error holding region 301).

In step S135, the range determining unit 241 determines whether or not all of the multiple candidate ranges have been specified, and in the event that all of the multiple candidate ranges have not been specified, returns the processing to step S132.

Subsequently, in step S132, the range determining unit 241 specifies, of the multiple candidate ranges, a candidate range that has not been specified yet, advances the processing to step S133, and thereafter, the same processing is performed.

Also, in the event that determination is made in step S135 that all of the multiple candidate ranges have been specified, the range determining unit 241 advances the processing to step S136.

In step S136, the range determining unit 241 determines whether or not all of the multiple feature points included in each piece of the shared information 65 included in the shared code book 81 have been taken as a feature point of interest, and in the event that determination is made that all of the multiple feature points have not been taken as a feature point of interest yet, returns the processing to step S131.

Subsequently, in step S131, the range determining unit 241 takes, of the multiple feature points included in each piece of the shared information 65, a feature point that has not been taken as a feature point of interest yet as a new feature point of interest, advances the processing to step S132, and thereafter, the same processing is performed.

Also, in the event that determination is made in step S136 that all of the multiple feature points included in each piece of the shared information 65 included in the shared code book 81 have been taken as a feature point of interest, the range determining unit 241 returns the processing to step S112 in FIG. 17, advances to step S113, and in step S113, the processing described with reference to the flowchart in FIG. 17 is performed.

As described above, with the second learning processing to be performed by the learning device 221, the size of a range whereby the error rate Error of mistaking identification of an image for generation becomes the minimum is determined to be the search range for each feature point included in the shared information 65 included in the shared code book 81' (e.g., shared information $65_2$), and dimensional feature amount making up the whole feature amount of the image for generation is calculated using the determined search range.

Accordingly, with the second learning processing, the whole feature amount can be calculated in a more accurate manner as compared to the case of calculating dimensional feature amount making up the whole feature amount of an image for generation using a search range having the same size for each feature point included in the shared information 65. Therefore, an identifier capable of identifying an object to be identified using the calculated whole feature amount in a more accurate manner can be generated.

Configuration Example of Identifying Device 321

Figure 19:
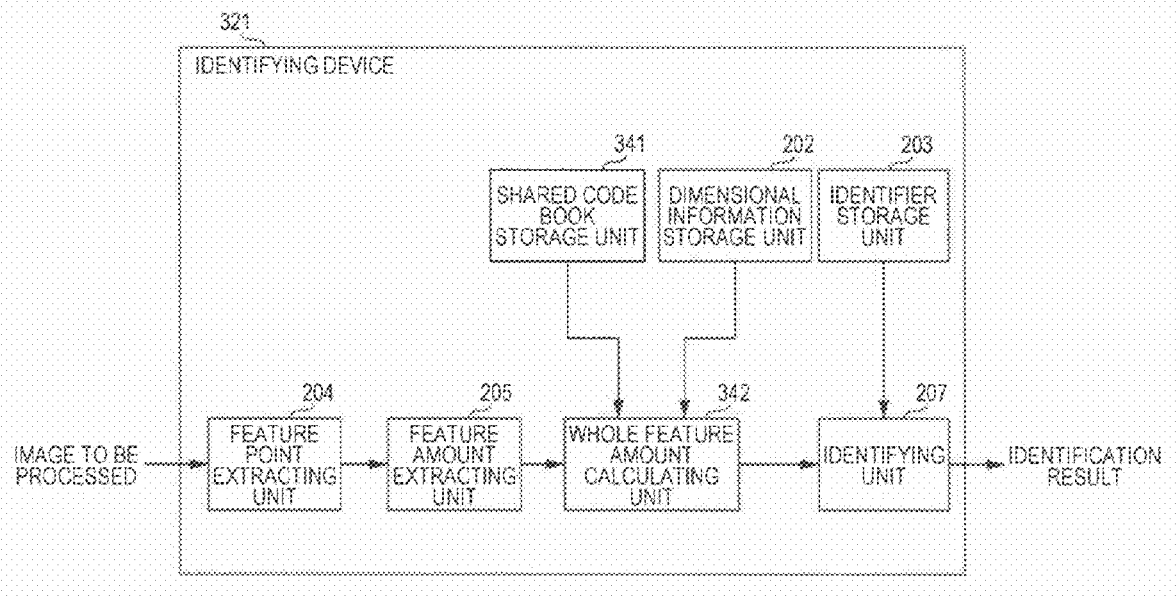
FIG. 19 is a block diagram illustrating a configuration example of a second identifying device for identifying an object to be identified using an identifier generated by learning of the learning device in FIG. 14.

FIG. 19 illustrates a configuration example of the identifying device 321 for performing identification of a subject existing on an image to be processed based on the identifier and dimensional information obtained by learning of the learning device 221.

This identifying device 321 uses the search range determined at the range determining unit 241 in addition to the identifier H(x) obtained by the learning device 221 (FIG. 14), and the minimum error dimensions d(1) through d(T) serving as dimensional information to identify whether a subject existing on an image to be processed is an object to be identified.

Note that, with the identifying device 321, portions configured in the same way as with the identifying device 181 in FIG. 12 are denoted with the same reference numerals, so description thereof will be omitted below.

Specifically, the identifying device 321 in FIG. 19 is configured in the same way as with the identifying device 181 in FIG. 12 except that a share code book storage unit 341 and a whole feature amount calculating unit 342 are provided instead of the shared code book storage unit 201 and the whole feature amount calculating unit 206.

The shared code book storage unit 341 stores the same shared code book 81' as that stored in the shared code book storage unit 242 of the learning device 221 (FIG. 14) beforehand.

The feature point feature amount of the image to be processed is supplied from the feature amount extracting unit 205 to the whole feature amount calculating unit 342.

The whole feature amount calculating unit 342 obtains from the feature point feature amount of the image to be processed from the feature amount extracting unit 205, dimensional feature amount making up the whole feature amount of the image to be processed thereof, based on the shared code book 81' stored in the shared code book storage unit 341, in the same way as with the whole feature amount calculating unit 243 of the learning device 221.

Operational Description of Identifying Device 321

Figure 20:
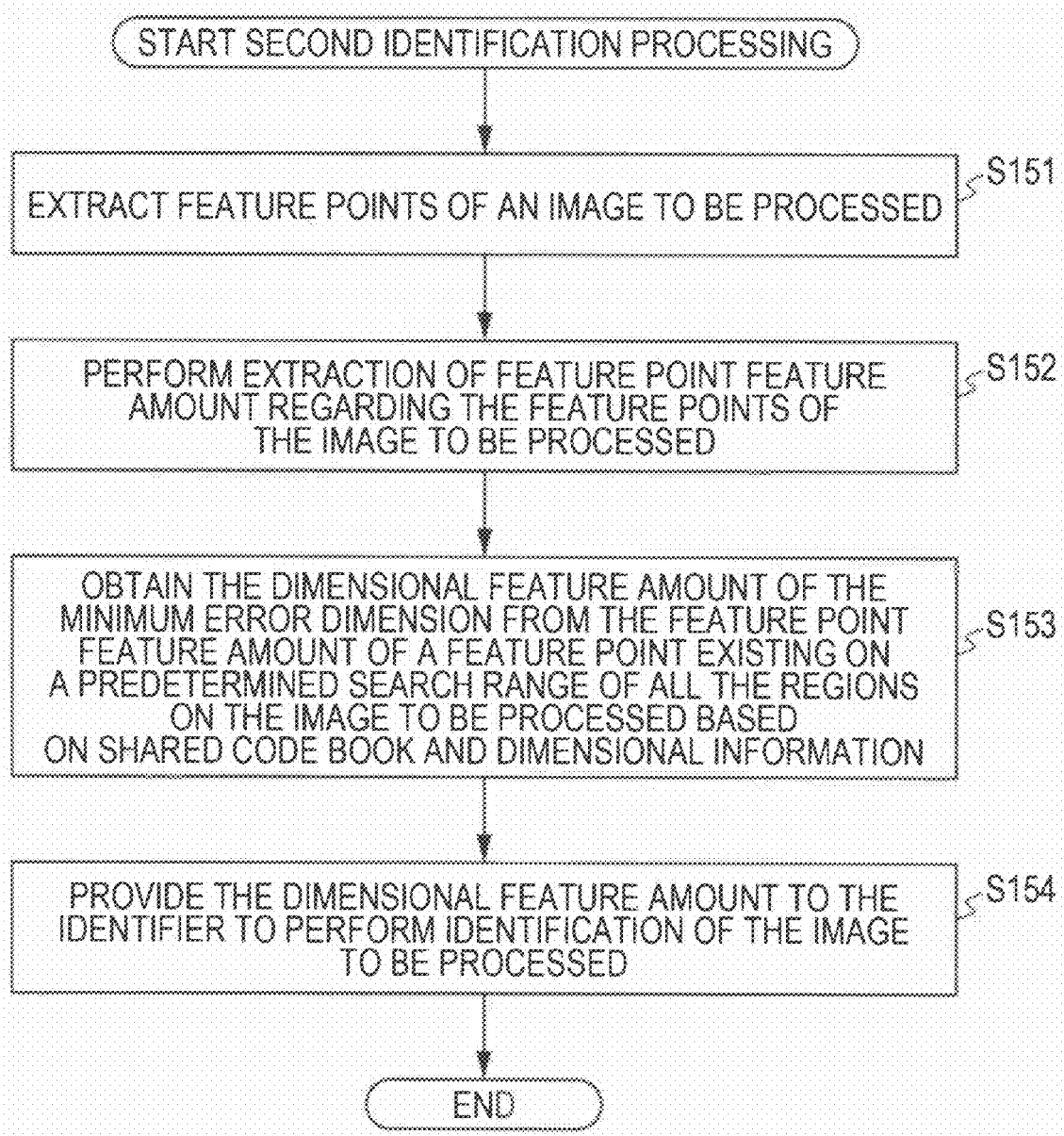
FIG. 20 is a flowchart for describing identification processing to be performed by the identifier in FIG. 19.

Next, the identification processing to be performed by the identifying device 321 (hereafter, referred to as "second identification processing") will be described with reference to the flowchart in FIG. 20.

This second identification processing is started, for example, in the event that the image to be processed has been supplied to the feature point extracting unit 204.

In steps S151 and S152, the same processing as steps S91 and S92 in FIG. 13 is performed, respectively.

In step S153, the whole feature amount calculating unit 342 obtains from the feature point feature amount of the image to be processed from the feature amount extracting unit 205, the dimensional feature amount $x_{d(1)}'$ through $x_{d(T)}'$ of the minimum error dimensions d(1) through d(T) serving as dimensional information stored in the dimensional information storage unit 202, of the dimensional feature amount making up the whole feature amount of the image to be processed thereof, based on the shared code book 81' stored in the shared code book storage unit 341.

Specifically, for example, the whole feature amount calculating unit 342 obtains the dimensional feature amount $x_{d(1)}'$ through $x_{d(T)}'$ of the minimum error dimensions d(1) through d(T) based on the search range correlated with each of the feature points included in the shared information 65 included in the shared code book 81' (e.g., shared information $65_2$ in the event of identifying whether or not an object to be identified belongs to the category B of automobiles), and the feature point feature amount correlated with each of the discriminators Cbn included in the shared information 65.

Subsequently, the whole feature amount calculating unit 342 supplies the dimensional feature amount $x_{d(1)}'$ through $x_{d(T)}'$ of the minimum error dimensions d(1) through d(T) to the identifying unit 207, and advances the processing to step S154.

In step S154, the same processing as step S94 in FIG. 13 is performed. So far the second identification processing is ended.

As described above, with the second identification processing, the size of a range whereby the error rate Error for mistaking identification of an image for generation become the minimum is determined to be the search range for each feature point included in the shared information 65 included in the shared code book 81' (e.g., shared information $65_2$), and the dimensional feature amount $x_{d(1)}'$ through $x_{d(T)}'$ of the minimum error dimensions d(1) through d(T) is obtained using the determined search range.

Accordingly, with the second identification processing, an object to be identified can be identified in a more accurate manner as compared to the case of obtaining the dimensional feature amount $x_{d(1)}'$ through $x_{d(T)}'$ using a search range having the same size for each feature point included in the shared information 65.

Modifications

With the first embodiment, the whole feature amount calculating unit 26 has calculated the whole feature amount with a correlation value as dimensional feature amount, but the whole feature amount is not restricted to this, in addition, for example, the histogram of an image for generation may be calculated as the whole feature amount.

In the event that the whole feature amount calculating unit 26 calculates the histogram of an image for generation as the whole feature amount, for example, the values of K pieces of feature point feature amount of the category to which an object to be identified belongs are taken as the number of steps.

Subsequently, the whole feature amount calculating unit 26 calculates the histogram of the image for generation so as to increment the frequency of the number of steps wherein the difference absolute value as to the value of the feature point feature amount of an interested feature point (feature point of interest) in the image for generation is the least, by one.

With the first embodiment, as an algorithm to be followed for the identifier generating unit 27 in FIG. 7 selecting dimensional feature amount, and generating an identifier, the Boosting algorithm has been employed, but the algorithm may not be restricted to this.

Specifically, as long as the identifier generating unit 27 can select dimensional feature amount, and can also Generate an identifier, the identifier generating unit 27 may follow any kind of algorithm other than the Boosting algorithm.

Also, with the first embodiment, an arrangement has been made wherein at the learning device 1, dimensional information for identifying the category of an object to be identified is selected, and also an identifier is generated, and the identifying device 181 identifies whether or not the object to be identified is an object to be identified belonging to a predetermined category, but the arrangement may be restricted to this.

Specifically, for example, an arrangement may be made wherein the learning device 1 selects dimensional information for identifying whether the object to be identified is a predetermined object itself, and also generates an identifier, and the identifying device 181 identifies whether or not the object to be identified is a predetermined object itself. In this case, the shared information 65 in the shared code book 81 is generated not for each category but for each object. This is true regarding the learning device 221 and identifying device 321 according to the second embodiment.

Also, with the first embodiment, the learning device 1 and the identifying device 181 have been configured as separate devices, but the learning device 1 and the identifying device 181 may be configured as a single device. This is true regarding the learning device 221 and identifying device 321 according to the second embodiment.

With the second embodiment, the shared code book 81' has been generated by determining the search range for each feature point included in the shared information 65 included in the shared code book 81, but an object of which the search range is to be determined is not restricted to this.

Specifically, for example, the search range has to be determined as an object of which the search range is to be determined, and any kind of object may be employed as long as this object is employed in the same way as with the shared code book 81.

Incidentally, the above series of processing can be executed by not only dedicated hardware but also software. In the event of the series of processing being executed by software, a program making up the software thereof is installed into a built-in computer, or for example, a general-purpose computer capable of executing various types of function by installing various types of program, or the like, from a recording medium.

Configuration Example of Computer

Figure 21:
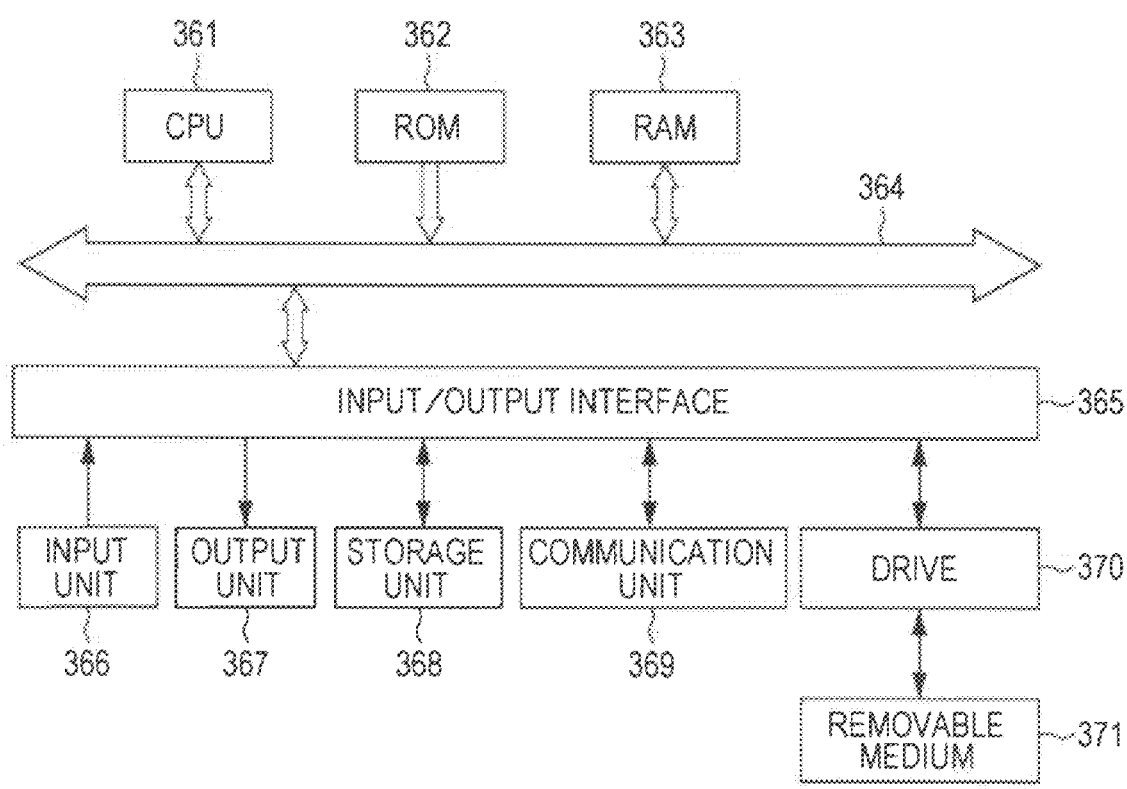
FIG. 21 is a block diagram illustrating a configuration example of a computer.

Next, FIG. 21 illustrates a configuration example of a personal computer for executing the above series of processing by a program.

A CPU (Central Processing Unit) 361 executes various types of processing in accordance with a program stored in ROM (Read Only Memory) 362 or a storage unit 368. A program to be executed by the CPU 361, data, and so forth are stored in RAM (Random Access Memory) 363 as appropriate. These CPU 361, ROM 362, and RAM 363 are mutually connected by a bus 364.

An input/output interface 365 is also connected to the CPU 361 via the bus 364. An input unit 366 made up of a keyboard, mouse, microphone, or the like, and an output unit 367 made up of a display, speaker, or the like are connected to the input/output interface 365. The CPU 361 executes, in response to a command to be input from the input unit 366, various types of processing. Subsequently, the CPU 361 outputs the processing results to the output unit 367.

The storage unit 368 connected to the input/output interface 365 is made up of, for example, a hard disk, and stores a program to be executed by the CPU 361, or various types of data. A communication unit 369 communicates with an external device via a network such as the Internet, a local area network.

Alternatively, an arrangement may be made wherein a program is obtained via the communication unit 369, and is stored in the storage unit 368.

A drive 370 connected to the input/output interface 365 drives, in the event of a removable medium 371 such as a magnetic disk, optical disc, or semiconductor has been mounted thereon, this medium to obtain a program, data, or the like recorded thereon. The obtained program or data is transferred to and stored in the storage unit 368 as appropriate.

A recording medium for recording (storing) a program to be installed into a computer, and to be caused to be in an executable state by the computer is configured of a removable medium 371 made up of, as illustrated in FIG. 21, a magnetic disk (including a flexible disk), optical disc (CD-ROM (Compact Disc-Read Only Memory), DVD (Digital Versatile Disc), magneto-optical disk (including MD (Mini-Disc)), semiconductor memory, or the like, or the ROM 362 in which a program is temporarily or eternally stored, or a hard disk making up the storage unit 368, or the like. Recording of a program to a recording medium is performed by taking advantage of a cable or wireless communication medium such as a local area network, the Internet, or digital satellite broadcasting via the communication unit 369 which is an interface such as a router or modem.

Note that, with the present Specification, a step describing the above series of processing includes not only processing to be performed in time sequence along described order, but also processing not necessarily to be processed in time sequence but to be executed in parallel or individually.

Also, embodiments of the present invention are not restricted to the above embodiments, and various modifications can be performed without departing from the essence of the present invention.

The present application contains subject matter related to that disclosed in Japanese Priority Patent Application JP 2010-015087 filed in the Japan Patent Office on Jan. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning device comprising:
feature point extracting means configured to extract a feature point from each of a plurality of images for generation to be used for generating an identifier for identifying whether or not a subject existing on an image is a predetermined object to be identified, which are made up of a positive image where said object to be identified exists, and a negative image where said object to be identified does not exist;
feature point feature amount extracting means configured to extract feature point feature amount representing the feature of said feature point from said image for generation;
whole feature amount calculating means configured to calculate the whole feature amount representing the feature of the whole of said image for generation from said feature point feature amount of said image for generation based on a shared code book including feature amount for generation to be commonly used for generation of an identifier for identifying each of different objects to be identified; and
identifier generating means configured to generate said identifier based on said whole feature amount of said image for generation, and a correct answer label representing whether said image for generation is said positive image or said negative image.

2. The learning device according to claim 1, further comprising:
shared code book storage means configured to store a shared code book configured of
a code book which holds each of a plurality of said feature amounts for generation in a manner correlated with a discriminator for discriminating said feature amount for generation, and
shared information that is a plurality of shared information created for each identifier for identifying each of different objects to be identified, and also includes said discriminator of said feature amount for generation to be used at the time of calculating said whole feature amount, of said plurality of feature amounts for generation;
wherein said whole feature amount calculating means calculate said whole feature amount using feature amount for generation correlated with said discriminator included in said shared information created regarding said identifier to be generated by said identifier generating means, of said plurality of feature amounts for generation held in said code book.

3. The learning device according to claim 2, wherein predetermined shared information of said plurality of shared information has the same discriminator as said discriminator included in other shared information.

4. The learning device according to claim 3, wherein said predetermined shared information has said discriminator also correlated with a feature point extracted from a model image that is said positive image;
and wherein said whole feature amount calculating means calculate said whole feature amount using feature amount for generation correlated with said discriminator, and the feature point feature amount of a feature point existing on a range determined based on said feature point correlated with said discriminator, of the whole range on said image for generation.

5. The learning device according to claim 4, wherein said discriminator included in said predetermined shared information is correlated with a feature point different from a feature point correlated with the same discriminator as said discriminator included in said other shared information.

6. The learning device according to claim 5, further comprising:
model image feature point extracting means configured to extract a feature point from a model image that is said positive image; and
quantizing means configured to quantize said feature point based on a frequency distribution in feature points of said model image;
wherein said shared information has said discriminator correlated with said feature point after quantization.

7. The learning device according claim 1, wherein said whole feature amount calculating means calculate a correlation value representing correlation between said feature amount for generation included in said shared code book, and said feature point feature amount of said image for generation as said whole feature amount.

8. The learning device according claim 1, wherein said identifier generating means generate, of a plurality of dimensional feature amounts that is each dimensional element of said whole feature amount to be represented with a plurality of dimensional vectors, said identifier for performing identification using said dimensional feature amount that reduces an error value representing a degree of mistaking identification of said positive image and said negative image, and dimensional information representing the dimension of said dimensional feature amount that reduces said error value.

9. A learning method of a learning device for learning an identifier for identifying a predetermined object to be identified, with said learning device including
feature point extracting means,
feature point feature amount extracting means,
whole feature amount calculating means, and
identifier generating means,
said learning method comprising the steps of:
extracting, with said feature point extracting means, a feature point from each of a plurality of images for generation to be used for generating an identifier for identifying whether or not a subject existing on an image is a predetermined object to be identified, which are made up of a positive image where said object to be identified exists, and a negative image where said object to be identified does not exist;
extracting, with said feature point feature amount extracting means, feature point feature amount representing the feature of said feature point from said image for generation;
calculating, with said whole feature amount calculating means, the whole feature amount representing the feature of the whole of said image for generation from said feature point feature amount of said image for generation based on a shared code book including feature amount for generation to be commonly used for generation of an identifier for identifying each of different objects to be identified; and
generating, with said identifier generating means, said identifier based on said whole feature amount of said image for generation, and a correct answer label representing whether said image for generation is said positive image or said negative image.

10. A non-transitory computer readable medium having computer readable instructions stored thereon that when executed by a processor implement a device comprising:
feature point extracting means configured to extract a feature point from each of a plurality of images for generation to be used for generating an identifier for identifying whether or not a subject existing on an image is a predetermined object to be identified, which are made up of a positive image where said object to be identified exists, and a negative image where said object to be identified does not exist;
feature point feature amount extracting means configured to extract feature point feature amount representing the feature of said feature point from said image for generation;
whole feature amount calculating means configured to calculate the whole feature amount representing the feature of the whole of said image for generation from said feature point feature amount of said image for generation based on a shared code book including feature amount for generation to be commonly used for generation of an identifier for identifying each of different objects to be identified; and
identifier generating means configured to generate said identifier based on said whole feature amount of said image for generation, and a correct answer label representing whether said image for generation is said positive image or said negative image.

11. An identifying device comprising:
feature point extracting means configured to extract a feature point from an image to be processed serving as a processing object for identifying whether or not a subject existing on an image is a predetermined object to be identified;
feature point feature amount extracting means configured to extract feature point feature amount representing the feature of said feature point from said image to be processed;
whole feature amount calculating means configured to calculate the whole feature amount representing the feature of the whole of said image to be processed from the feature point feature amount of said image to be processed, based on a shared code book including feature amount for generation to be commonly used for generation of an identifier for identifying each of different objects to be identified; and
identifying means configured to identify, based on an identifier for identifying whether or not a subject existing on an image is a predetermined object to be identified, and said whole feature amount, whether or not a subject existing on said image to be processed is a predetermined object to be identified.

12. The identifying device according to claim 11, further comprising:
shared code book storage means configured to store a shared code book configured of
a code book which holds each of a plurality of said feature amounts for generation in a manner correlated with a discriminator for discriminating said feature amount for generation, and
shared information that is a plurality of shared information created for each identifier for identifying each of different objects to be identified, and also includes said discriminator of said feature amount for generation to be used at the time of calculating said whole feature amount, of said plurality of feature amounts for generation;
wherein said whole feature amount calculating means calculate said whole feature amount using feature amount for generation correlated with said discriminator included in said shared information created regarding said identifier to be used by said identifying means, of said plurality of feature amounts for generation held in said code book.

13. The identifying device according to claim 12, wherein predetermined shared information of said plurality of shared information has the same discriminator as said discriminator included in other shared information.

14. The identifying device according to claim 13, wherein said predetermined shared information has said discriminator also correlated with a feature point extracted from a model image on which said predetermined object to be identified exists;
and wherein said whole feature amount calculating means calculate said whole feature amount using feature amount for generation correlated with said discriminator, and the feature point feature amount of a feature point existing on a range determined based on said feature point correlated with said discriminator, of the whole range on said image to be processed.

15. The identifying device according to claim 14, wherein said discriminator included in said shared information is correlated with a feature point different from a feature point correlated with the same discriminator as said discriminator included in said other shared information.

16. The identifying device according to claim 11, wherein said whole feature amount calculating means calculate a correlation value representing correlation between said feature amount for generation included in said shared code book, and said feature point feature amount of said image to be processed as said whole feature amount.

17. The identifying device according to claim 11, wherein said whole feature amount calculating means calculate the whole feature amount representing the whole of said image to be processed, which is made up of a plurality of dimensional feature amounts, from the feature point feature amount of said image to be processed based on said shared code book;
and wherein said identifying means identify whether or not a subject existing on said image to be processed is a predetermined object to be identified by providing predetermined dimensional feature amount of said plurality of dimensional feature amounts making up said whole feature amount to an identifier for identifying whether or not the subject exiting on the image is a predetermined object to be identified, as input.

18. The identifying device according to claim 17, wherein said identifying means provide the dimensional feature amount of the dimension represented by dimensional information, of said plurality of dimensional feature amounts making up said whole feature amount, to an identifier for identifying whether or not a subject existing on an image is a predetermined object to be identified, as input, thereby identifying whether or not a subject appears on said image to be processed is a predetermined object to be identified;
and wherein said identifier performs identification using, of said plurality of dimensional information representing said whole feature amount, said dimensional feature amount that reduces an error value representing a degree of mistaking identification regarding whether said object to be identified is a positive image existing on an image, or a negative image not existing on the image;

and wherein said dimensional information represents the dimension of said dimensional feature amount that reduces said error value.

19. An identifying method of an identifying device for identifying whether or not a subject appearing on an image is a predetermined object to be identified, with said identifying device including feature point extracting means,
feature point feature amount extracting means,
whole feature amount calculating means, and
identifying means, said identifying method comprising the steps of:

extracting, with said feature point extracting means, a feature point from an image to be processed serving as a processing object for identifying whether or not a subject existing on an image is a predetermined object to be identified;

extracting, with said feature point feature amount extracting means, feature point feature amount representing the feature of said feature point from said image to be processed;

calculating, with said whole feature amount calculating means, the whole feature amount representing the feature of the whole of said image to be processed from the feature point feature amount of said image to be processed, based on a shared code book including feature amount for generation to be commonly used for generation of an identifier for identifying each of different objects to be identified; and identifying, with said identifying means, whether or not a subject existing on said image to be processed is a predetermined object to be identified, based on an identifier for identifying whether or not a subject exiting on an image is a predetermined object to be identified, and said whole feature amount.

20. A non-transitory computer readable medium having computer readable instructions stored thereon that when executed by a processor implement a device comprising:

feature point extracting means configured to extract a feature point from an image to be processed serving as a processing object for identifying whether or not a subject existing on an image is a predetermined object to be identified;

feature point feature amount extracting means configured to extract feature point feature amount representing the feature of said feature point from said image to be processed;

whole feature amount calculating means configured to calculate the whole feature amount representing the feature of the whole of said image to be processed from the feature point feature amount of said image to be processed, based on a shared code book including feature amount for generation to be commonly used for generation of an identifier for identifying each of different objects to be identified; and identifying means configured to identify whether or not a subject existing on said image to be processed is a predetermined object to be identified, based on an identifier for identifying whether or not a subject exiting on an image is a predetermined object to be identified, and said whole feature amount.

21. A learning device comprising:

a feature point extracting unit configured to extract a feature point from each of a plurality of images for generation to be used for generating an identifier for identifying whether or not a subject existing on an image is a predetermined object to be identified, which are made up of a positive image where said object to be identified exists, and a negative image where said object to be identified does not exist;

a feature point feature amount extracting unit configured to extract feature point feature amount representing the feature of said feature point from said image for generation;

a whole feature amount calculating unit configured to calculate the whole feature amount representing the feature of the whole of said image for generation from said feature point feature amount of said image for generation based on a shared code book including feature amount for generation to be commonly used for generation of an identifier for identifying each of different objects to be identified; and an identifier generating unit configured to generate said identifier based on said whole feature amount of said image for generation, and a correct answer label representing whether said image for generation is said positive image or said negative image.

22. An identifying device comprising:

a feature point extracting unit configured to extract a feature point from an image to be processed serving as a processing object for identifying whether or not a subject existing on an image is a predetermined object to be identified;

a feature point feature amount extracting unit configured to extract feature point feature amount representing the feature of said feature point from said image to be processed;

a whole feature amount calculating unit configured to calculate the whole feature amount representing the feature of the whole of said image to be processed from the feature point feature amount of said image to be processed, based on a shared code book including feature amount for generation to be commonly used for generation of an identifier for identifying each of different objects to be identified; and an identifying unit configured to identify, based on an identifier for identifying whether or not a subject existing on an image is a predetermined object to be identified, and said whole feature amount, whether or not a subject existing on said image to be processed is a predetermined object to be identified.

* * * * *